United States Patent
Kamei et al.

(10) Patent No.: US 10,985,836 B2
(45) Date of Patent: Apr. 20, 2021

(54) COMMUNICATION PROCESSING SYSTEM, COMMUNICATION PROCESSING METHOD, BASE STATION, AND CONTROL METHOD AND CONTROL PROGRAM THEREOF

(71) Applicant: NEC CORPORATION, Tokyo (JP)

(72) Inventors: Akira Kamei, Tokyo (JP); Toru Yamada, Tokyo (JP); Kyoji Hirata, Tokyo (JP); Yumiko Okuyama, Tokyo (JP); Masahiro Serizawa, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/483,320

(22) PCT Filed: Jan. 10, 2018

(86) PCT No.: PCT/JP2018/000360
§ 371 (c)(1),
(2) Date: Aug. 2, 2019

(87) PCT Pub. No.: WO2018/142862
PCT Pub. Date: Aug. 9, 2018

(65) Prior Publication Data
US 2019/0379450 A1    Dec. 12, 2019

(30) Foreign Application Priority Data
Feb. 3, 2017   (JP) .............................. JP2017-018830

(51) Int. Cl.
*H04B 7/26*        (2006.01)
*H04B 7/155*       (2006.01)
(Continued)

(52) U.S. Cl.
CPC ....... *H04B 7/2606* (2013.01); *H04B 7/15507* (2013.01); *H04B 17/318* (2015.01); *H04W 40/10* (2013.01); *H04W 88/04* (2013.01)

(58) Field of Classification Search
CPC ..... H04W 40/04; H04W 40/10; H04W 88/04; H04W 92/18; H04B 17/318; H04B 7/15507
See application file for complete search history.

(56) References Cited

U.S. PATENT DOCUMENTS

| | | | |
|---|---|---|---|
| 2008/0214182 A1* | 9/2008 | Wang | H04W 52/46 455/423 |
| 2010/0167743 A1 | 7/2010 | Palanki et al. | |

(Continued)

FOREIGN PATENT DOCUMENTS

| | | |
|---|---|---|
| JP | 2006-246202 A | 9/2006 |
| JP | 2012-222437 A | 11/2012 |

(Continued)

OTHER PUBLICATIONS

3GPP TS 23.303 V14.1.0, 3rd Generation Partnership Project; Technical Specification Group Services and System Aspects; Proximity-based services (ProSe); Stage 2 (release 14), Dec. 2016, 15 pages.

(Continued)

*Primary Examiner* — Gbemileke J Onamuti
(74) *Attorney, Agent, or Firm* — Sughrue Mion, PLLC

(57) ABSTRACT

This invention provides a communication processing system that stably efficiently uses a resource in a cell managed by a base station. The communication processing system includes a communication terminal, a base station, a plurality of relay stations that relay communication between the communication terminal and the base station, a measurer in the communication terminal that measures strengths of received signals from the plurality of relay stations, and a selector in the base station that selects a relay station that (Continued)

connects the base station and the communication terminal, based on a comparison result of at least one capability of capabilities had by each of the plurality of relay stations, when there exist a plurality of relay stations whose strengths of received signals are more than a threshold.

20 Claims, 21 Drawing Sheets

(51) Int. Cl.
  *H04B 17/318* (2015.01)
  *H04W 88/04* (2009.01)
  *H04W 40/10* (2009.01)

(56) References Cited

U.S. PATENT DOCUMENTS

| | | | |
|---|---|---|---|
| 2013/0237228 A1 | 9/2013 | Womack et al. | |
| 2016/0338122 A1* | 11/2016 | Tsai | H04L 5/00 |
| 2017/0134981 A1* | 5/2017 | Duschl | H04W 40/00 |
| 2019/0319723 A1* | 10/2019 | Axmon | H04B 17/309 |

FOREIGN PATENT DOCUMENTS

| | | |
|---|---|---|
| WO | 2016/208097 A1 | 12/2016 |
| WO | 2016/208098 A1 | 12/2016 |

OTHER PUBLICATIONS

3GPP TS 36.300 V13.6.0, 3rd Generation Partnership Project; Technical Specification Group Radio Access Network; Evolved Universal Terrestrial Radio Access (E-UTRAN) and Evolved Universal Terrestrial Radio Access Network (E-UTRAN); Overall description; Stage 2 (release 13), Dec. 2016, 20 pages.
"Consideration on ProSe Relays Selection", Sony, SA WG2 Meeting #105, S2-143134, Oct. 13-17, 2014, pp. 1-7, Sapporo, Japan.
International Search Report for PCT/JP2018/000360 dated Apr. 3, 2018 [PCT/ISA/210].

* cited by examiner

Architecture model using a ProSe UE-to-Network Relay

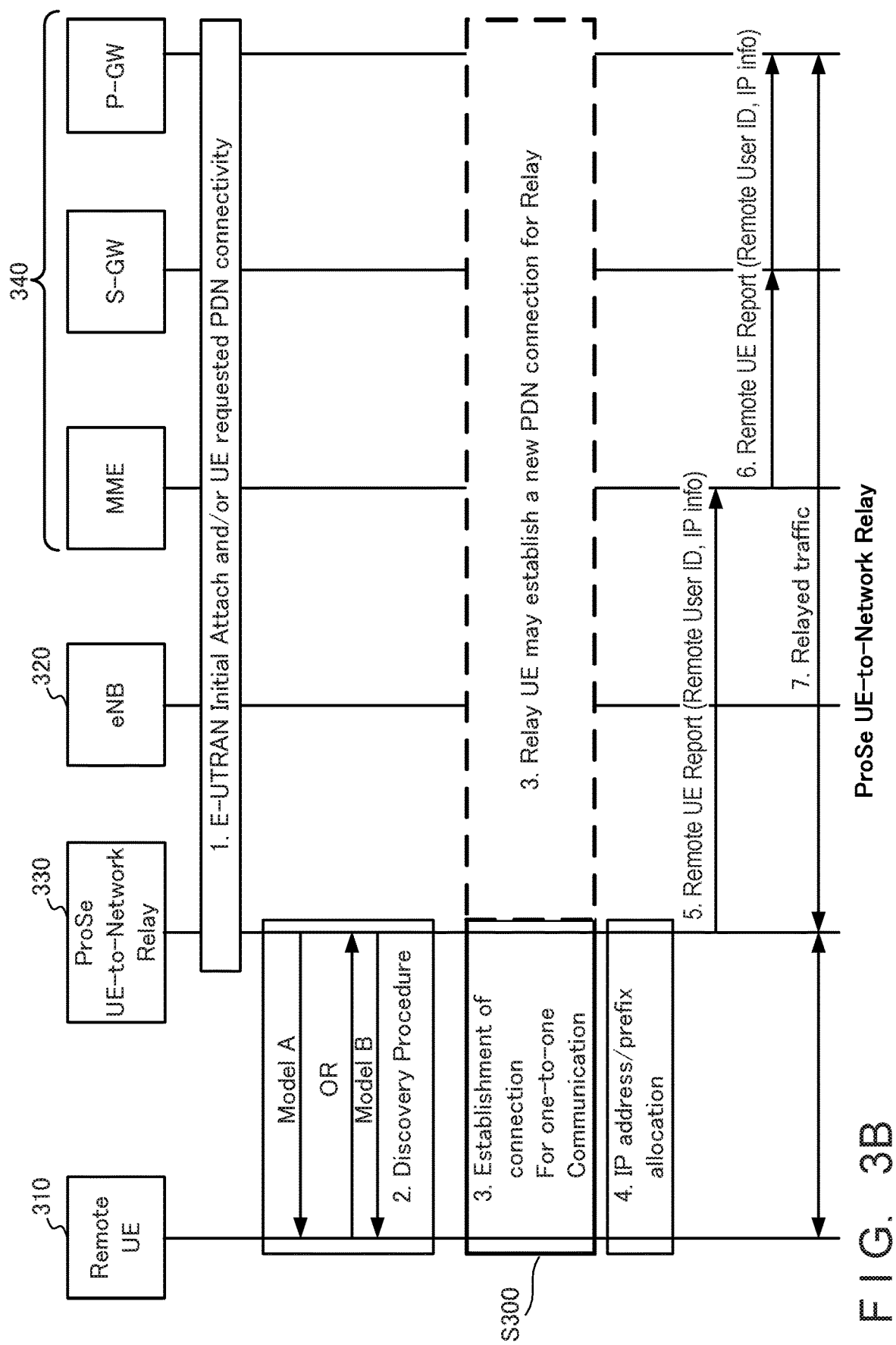

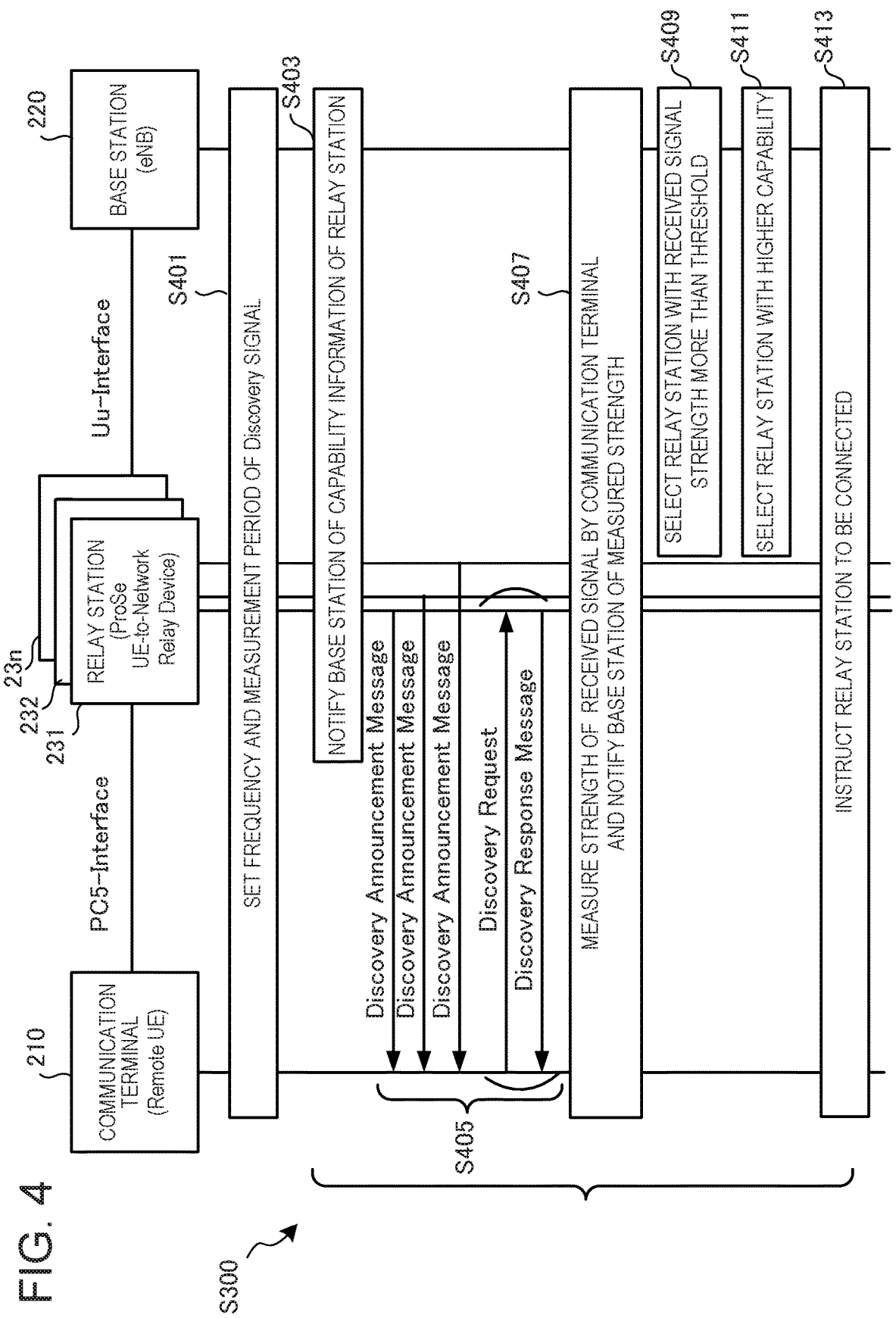

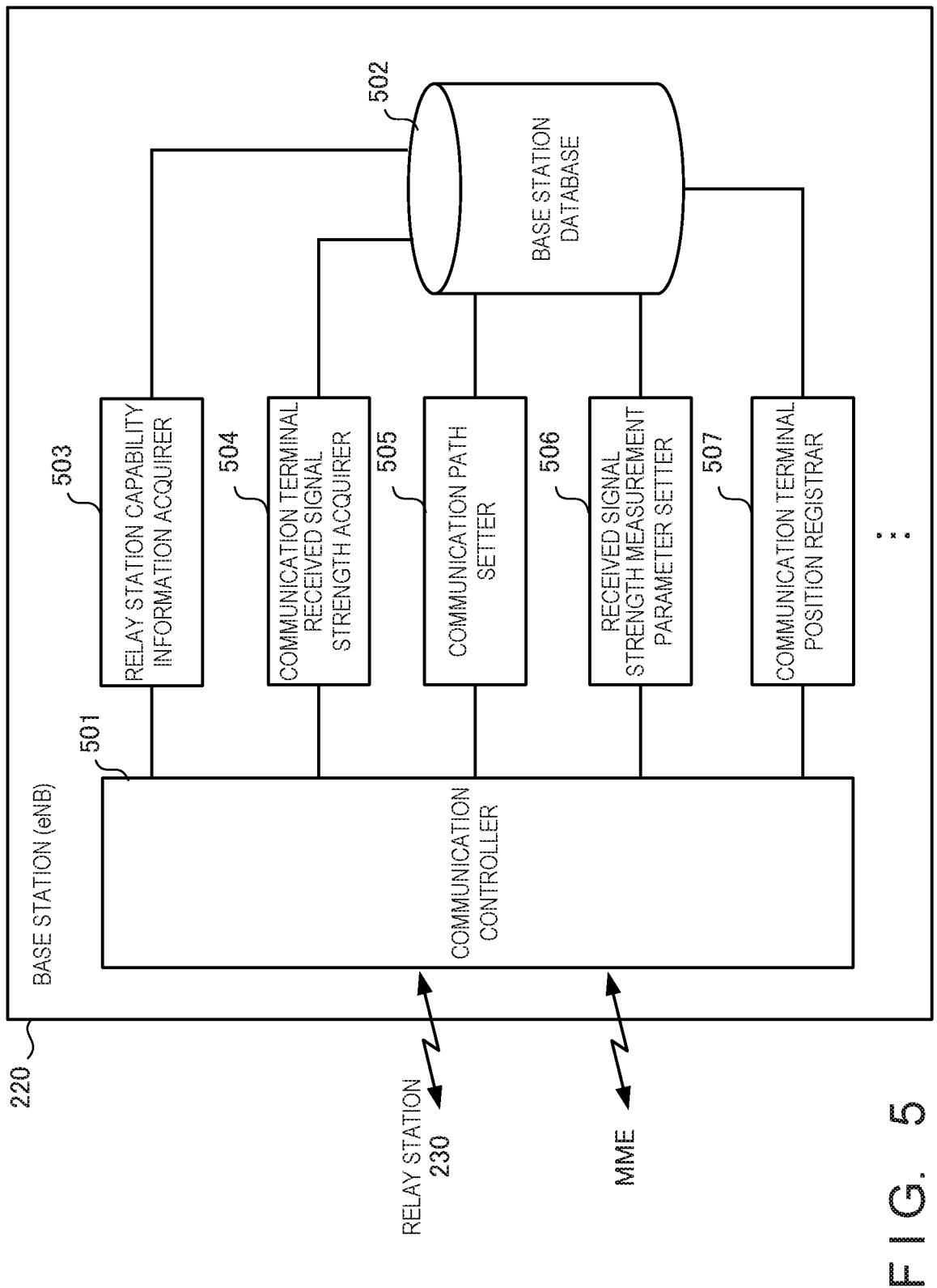
F I G. 5

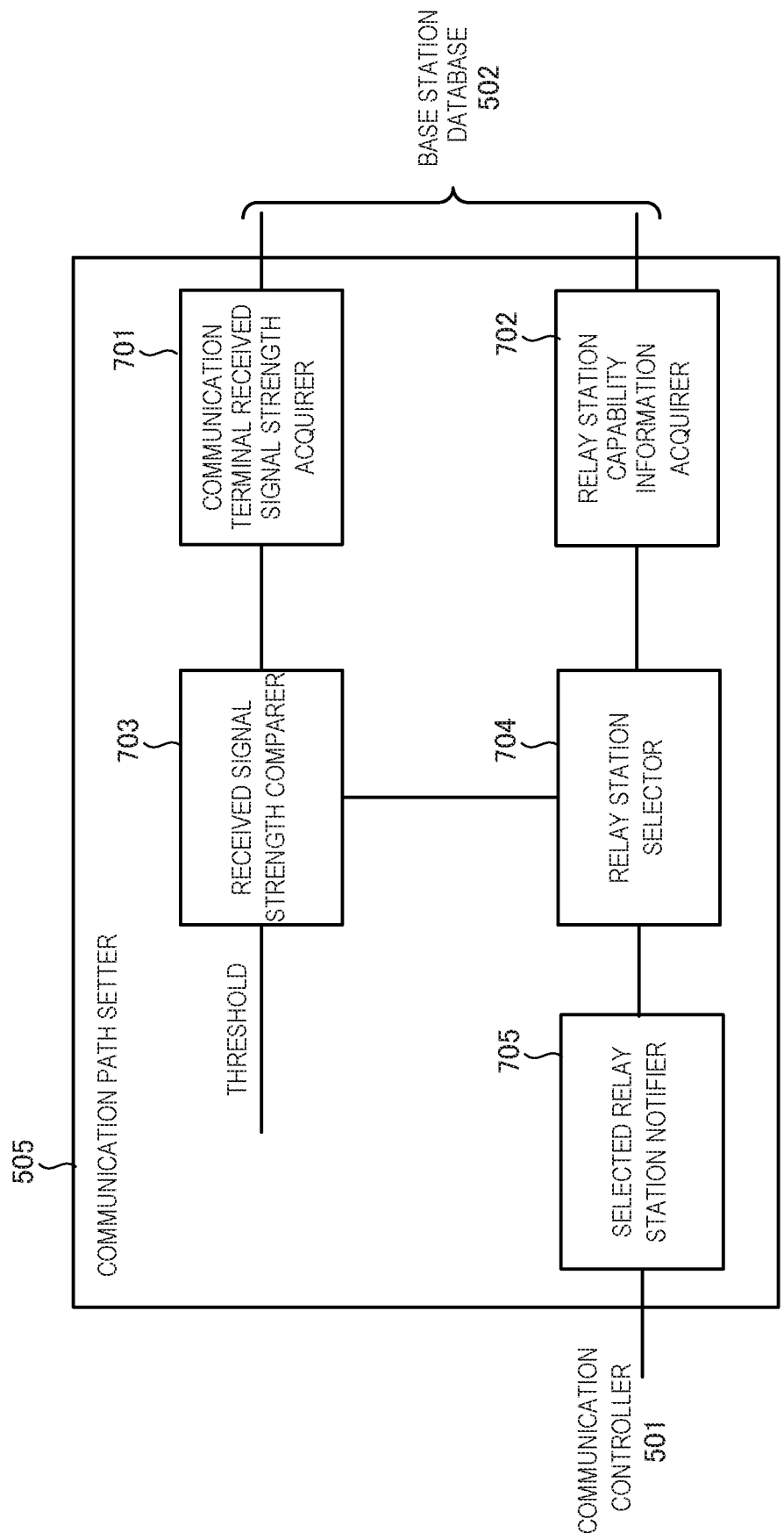
F I G. 7

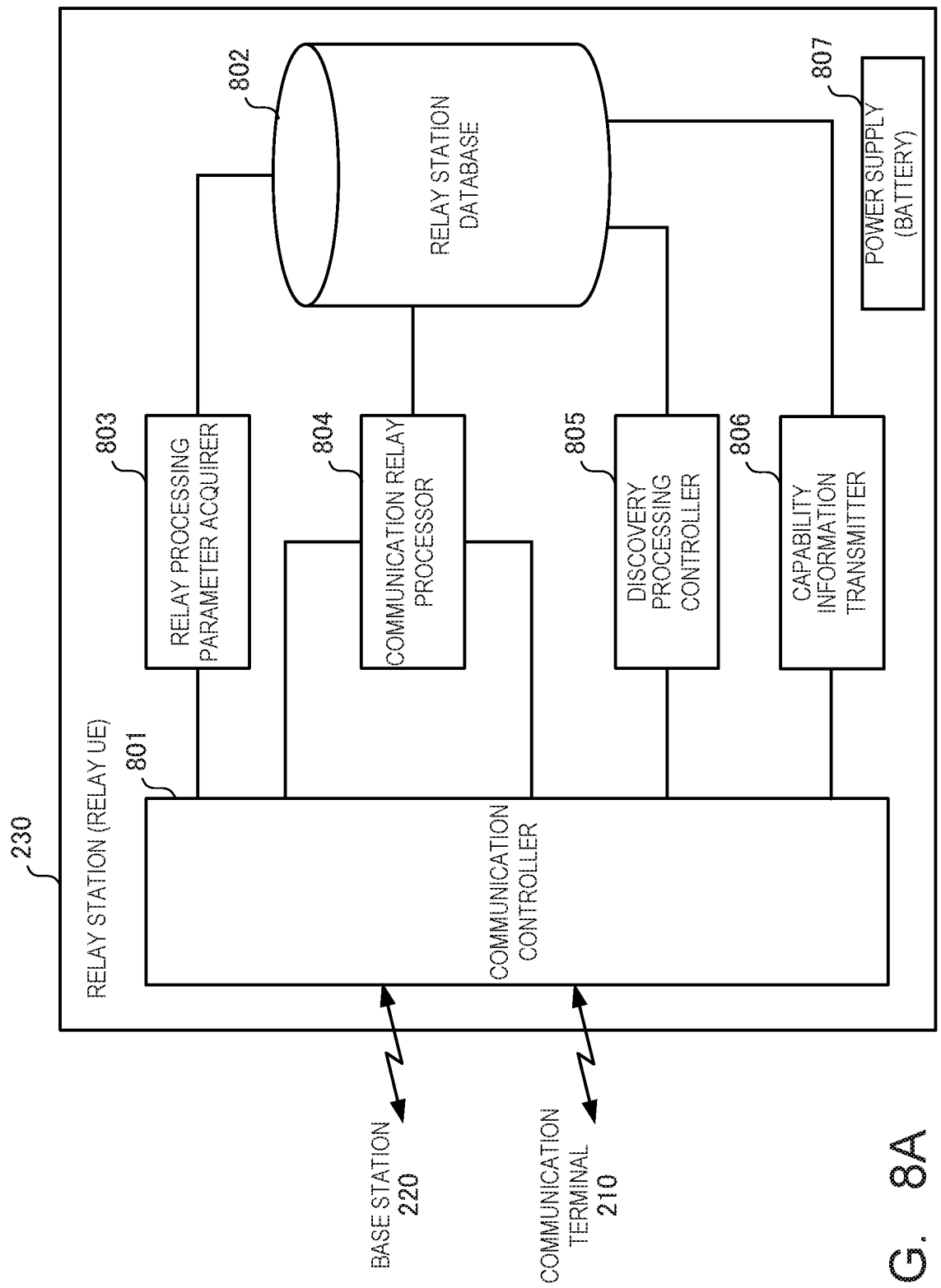
F I G. 8A

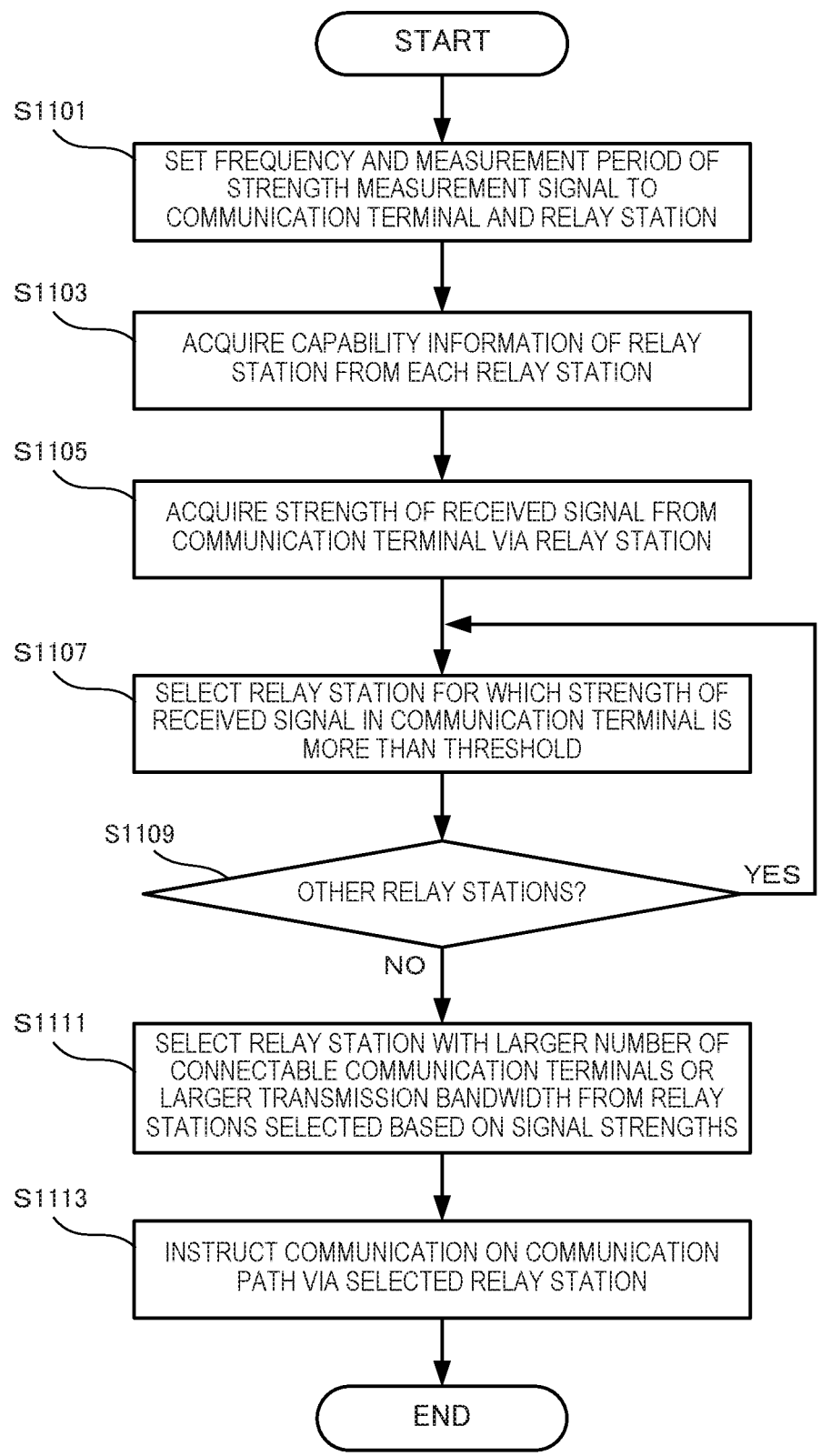
F I G. 11

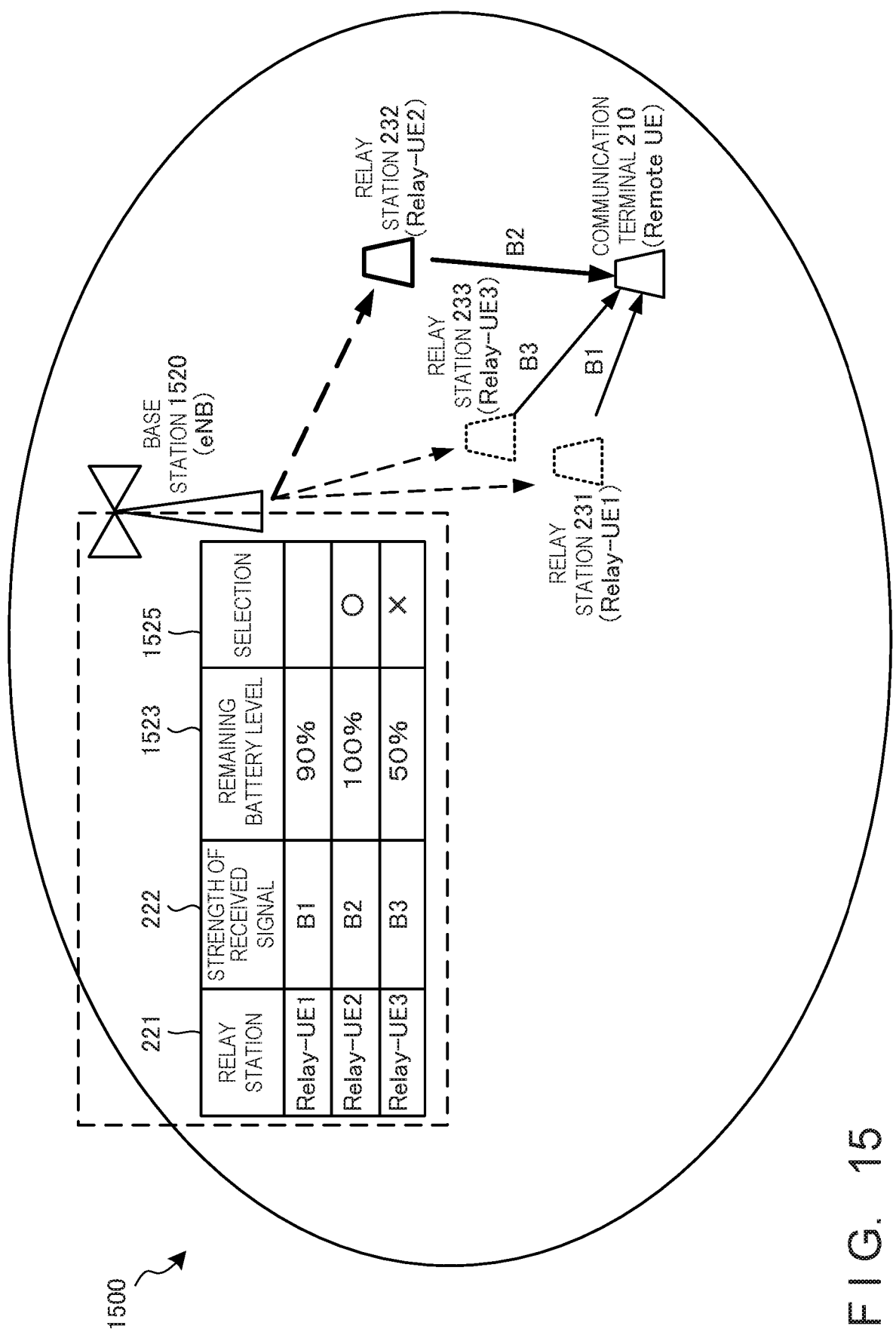
F I G. 15

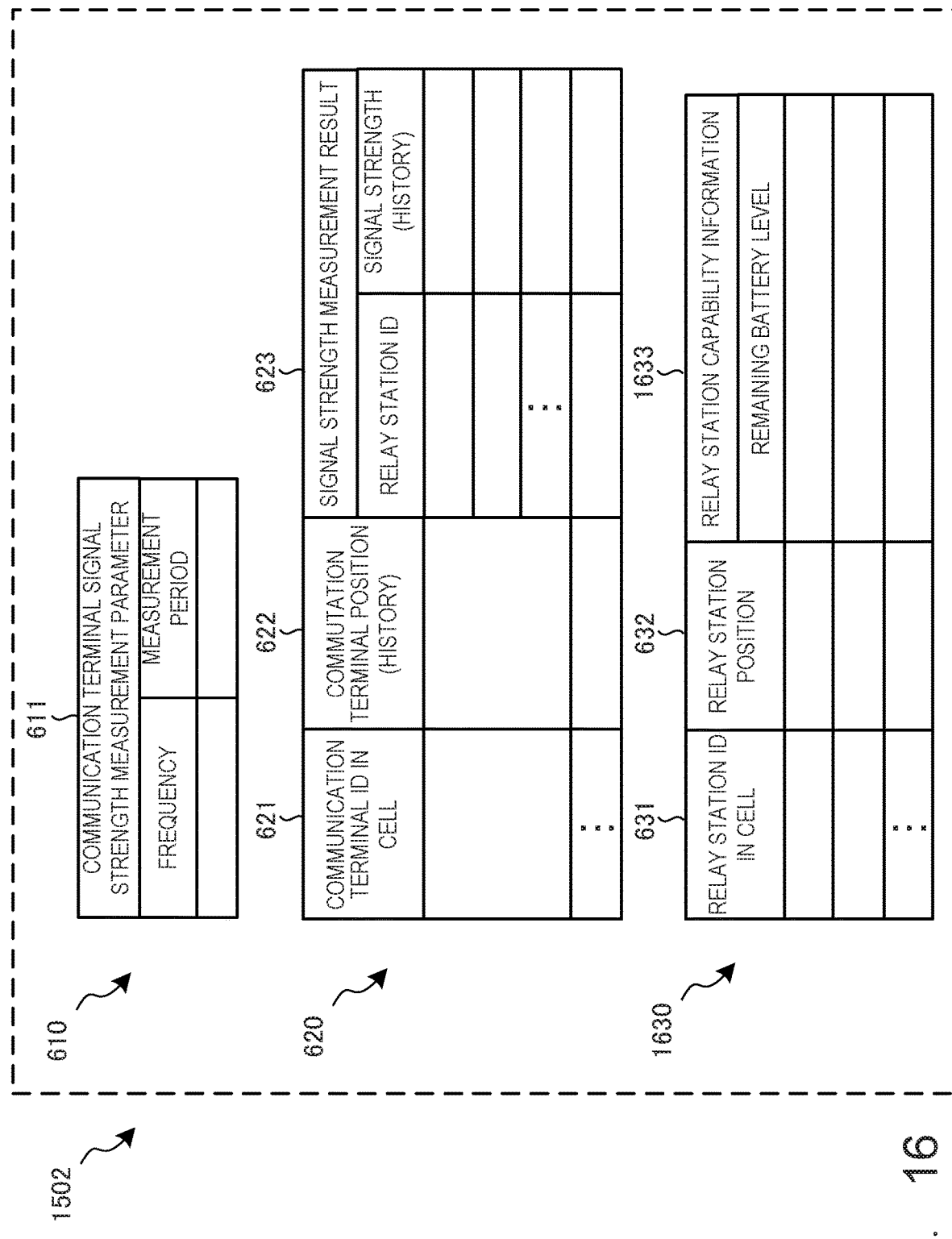
F I G. 16

COMMUNICATION PROCESSING SYSTEM, COMMUNICATION PROCESSING METHOD, BASE STATION, AND CONTROL METHOD AND CONTROL PROGRAM THEREOF

This application is a National Stage of International Application No. PCT/JP2018/000360, filed on Jan. 10, 2018, which claims the benefit of priority from Japanese patent application No. 2017-018830, filed on Feb. 3, 2017, the disclosure of which is incorporated herein in its entirety by reference.

TECHNICAL FIELD

The present invention relates to a communication processing system, a communication processing method, a base station, and a control method and a control program thereof.

BACKGROUND ART

Currently, the 3GPP is examining a method of transmitting data from a remote device (remote UE: Remote User Equipment) to a base station via a relay device (relay UE: Relay User Equipment/UE-to-Network Relay device), and methods are disclosed in non-patent literatures 1 and 2.

In non-patent literature 1, an architecture model is described in "4.4.3 ProSe UE-to-Network Relay for Public Safety", and a procedure of establishing ProSe (D2D) connection via UE-to-Network Relay is described in FIG. 5.4.4.1-1 in "5.4.4 Direct communication via ProSe UE-to-Network Relay". The explanation of FIG. 5.4.4.1-1 includes an account saying "even after the connection using the relay UE, to reselect a relay UE, the remote UE continuously measures the signal strength of the discovery message sent from the relay UE" (see non-patent literature 1, p. 102, lines 14-21).

Additionally, "23.10.4 Sidelink Communication via ProSe UE-to-Network Relay" in non-patent literature 2 writes that "whether a UE can operate as a relay UE is controlled by a base station" and that "a remote UE selects a relay UE of the highest PC5 link quality, and if the signal strength of the PC5 link is less than a preset threshold, a relay UE reselection process is performed" (see non-patent literature 2, p. 283, lines 1-8).

In the above technical field, patent literature 1 discloses a technique of selecting a relay station (Relay Node) based on a relay node selection rank in a UA (user agent) and notifying an access node of it. In patent literature 1, the relay node selection rank is obtained based on a relay node power (measured relay node power), a preference or priority parameter, a power offset parameter, and a history (hysteresis parameter).

CITATION LIST

Patent Literature

Patent literature 1: U.S. Patent Application Publication No. 2013/0237228

Non-Patent Literature

Non-patent literature 1: 3GPP TS 23.303 V14.1.0 (2016-12) Proximity-based service (ProSe)
Non-patent literature 2: 3GPP TS 36.300 V13.6.0 (2016-12) E-UTRAN Overall description

SUMMARY OF THE INVENTION

Technical Problem

However, in the techniques described in the above literatures, since selection of the relay station is left to the UA, it is impossible to stably efficiently use a resource in a cell managed by the access node (base station).

The present invention enables to provide a technique of solving the above-described problem.

Solution to Problem

One example aspect of the present invention provides a communication processing system comprising:
a communication terminal;
a base station;
a plurality of relay stations that relay communication between the communication terminal and the base station;
a measurer that measures a received signal strength from each of the plurality of relay stations in the communication terminal; and
a selector that selects, in the base station, a relay station that connects the base station and the communication terminal, based on a comparison result of at least one capability of capabilities of the relay stations in a case in which there exist a plurality of relay stations whose received signal strengths are more than a threshold.

Another example aspect of the present invention provides a communication processing method of a communication processing system including a communication terminal, a base station, and a plurality of relay stations that relay communication between the communication terminal and the base station, comprising:
measuring a received signal strength from each of the plurality of relay stations in the communication terminal; and
selecting, in the base station, a relay station that connects the base station and the communication terminal, based on a comparison result of at least one capability of capabilities of the relay stations in a case in which there exist a plurality of relay stations whose received signal strengths are more than a threshold.

Still other example aspect of the present invention provides a base station comprising:
a receiver that receives a received signal strength from each of the plurality of relay stations that relay communication between a communication terminal and the base station, which is measured in the communication terminal;
a storage unit that receives a capability from each of the plurality of relay stations and stores the capability in association with each relay station; and
a selector that selects a relay station that connects the base station and the communication terminal, based on a comparison result of at least one capability of the capabilities of the relay stations in a case in which there exist a plurality of relay stations whose received signal strengths are more than a threshold.

Still other example aspect of the present invention provides a control method of a base station, comprising:
receiving a received signal strength from each of the plurality of relay stations that relay communication between a communication terminal and the base station, which is measured in the communication terminal;
receiving a capability from each of the plurality of relay stations and storing the capability in association with each relay station; and selecting a relay station that connects the base station and the communication terminal, based on a comparison result of at least one capability of the capabilities of the relay stations in a case in which there exist a plurality of relay stations whose received signal strengths are more than a threshold.

Still other example aspect of the present invention provides a base station control program for causing a computer to execute a method, comprising:

receiving a received signal strength from each of plurality of relay stations that relay communication between a communication terminal and the base station, which is measured in the communication terminal;

receiving a capability from each of the plurality of relay stations and storing the capability in association with each relay station; and selecting a relay station that connects the base station and the communication terminal, based on a comparison result of at least one capability of the capabilities of the relay stations in a case in which there exist a plurality of relay stations whose received signal strengths are more than a threshold.

Advantageous Effects of Invention

According to the present invention, it is possible to stably efficiently use the resource in the cell managed by the base station.

BRIEF DESCRIPTION OF DRAWINGS

FIG. 3B is a sequence chart showing the standard operation of the communication processing system according to the technical premise;

FIG. 4 is a sequence chart showing the operation of the communication processing system according to the second example embodiment of the present invention;

FIG. 5 is a block diagram showing the functional arrangement of a communication processing apparatus (base station: eNB) according to the second example embodiment of the present invention;

FIG. 7 is a block diagram showing the functional arrangement of a communication path setter according to the second example embodiment of the present invention;

FIG. 8A is a block diagram showing the functional arrangement of a relay station (relay UE) according to the second example embodiment of the present invention;

FIG. 11 is a flowchart showing the processing procedure of the communication processing apparatus (base station: eNB) according to the second example embodiment of the present invention;

FIG. 15 is a view showing the arrangement of a communication processing system according to the fourth example embodiment of the present invention;

FIG. 16 is a view showing the arrangement of a base station database according to the fourth example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A communication processing system 100 according to the first example embodiment of the present invention will be described with reference to FIG. 1. The communication processing system 100 is a system including a relay station.

Figure 1:
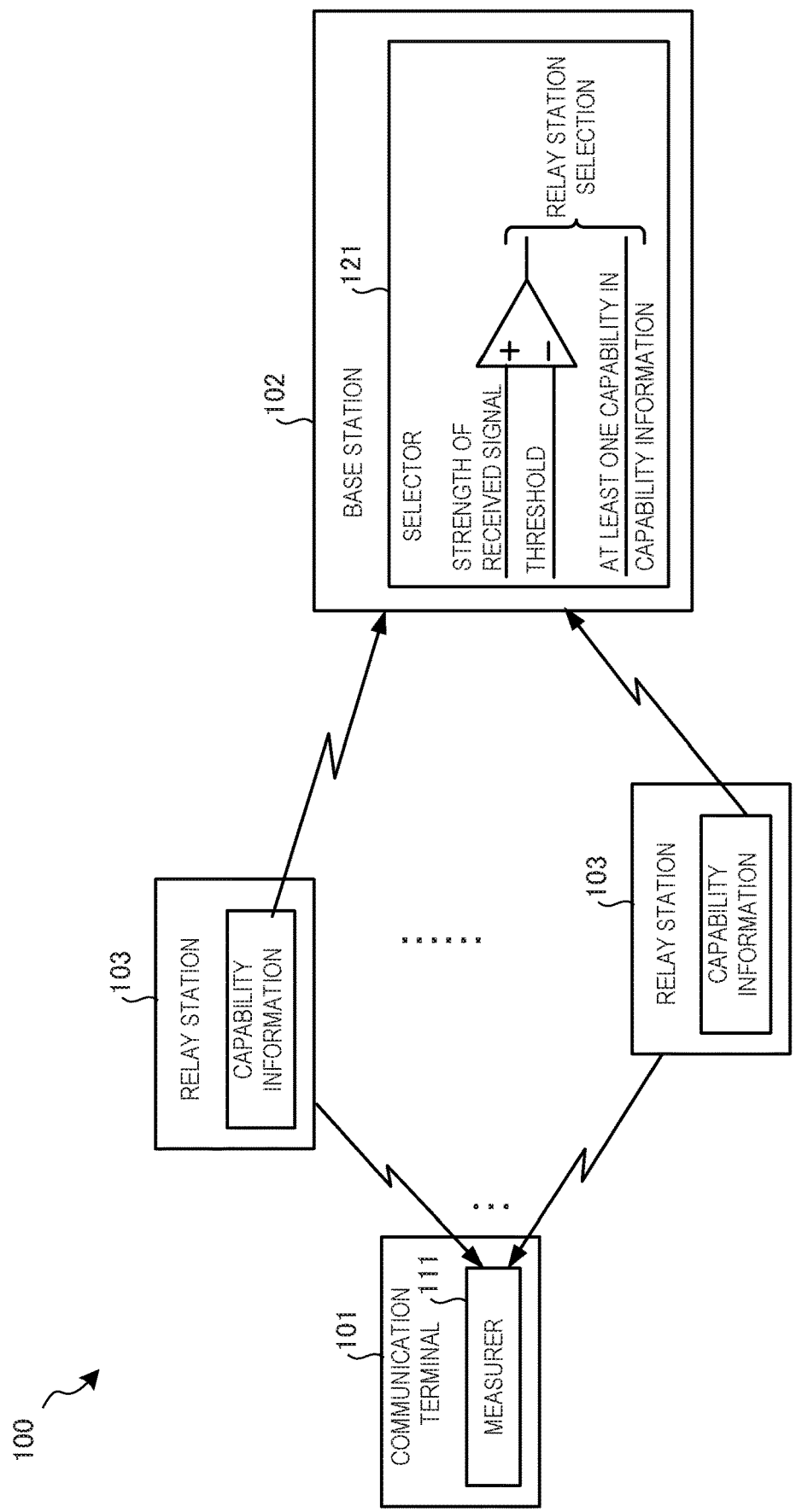
FIG. 1 is a block diagram showing the arrangement of a communication processing system according to the first example embodiment of the present invention.

As shown in FIG. 1, the communication processing system 100 includes a communication terminal 101, a base station 102, a plurality of relay stations 103, a measurer 111, and a selector 121. The plurality of relay stations 103 relay communication between the communication terminal 101 and the base station 102. The measurer 111 in the communication terminal 101 measures strengths of signals received from the plurality of relay stations 103. The selector 121 in the base station 102 selects a relay station that connects the base station 102 and the communication terminal 101, based on the comparison result of at least one capability of the capabilities had by each of the plurality of relay stations, when there exist a plurality of relay stations whose strengths of received signal are more than a threshold.

According to this example embodiment, the communication path is selected in accordance with the at least one capability of the relay station. It is therefore possible to stably efficiently use the resource in the cell managed by the base station.

Second Example Embodiment

A communication processing system according to the second example embodiment of the present invention will be described next. In the communication processing system according to this example embodiment, the number of connectable communication terminals or the transmission bandwidth is taken into consideration as the capability information of each relay station, and a relay station that relays a communication terminal and a base station is selected in relay stations for which received signal strengths from the relay stations, which are measured by the communication terminal, are more than a threshold.

<<Outline of Arrangement of Communication Processing System>>

Figure 2:
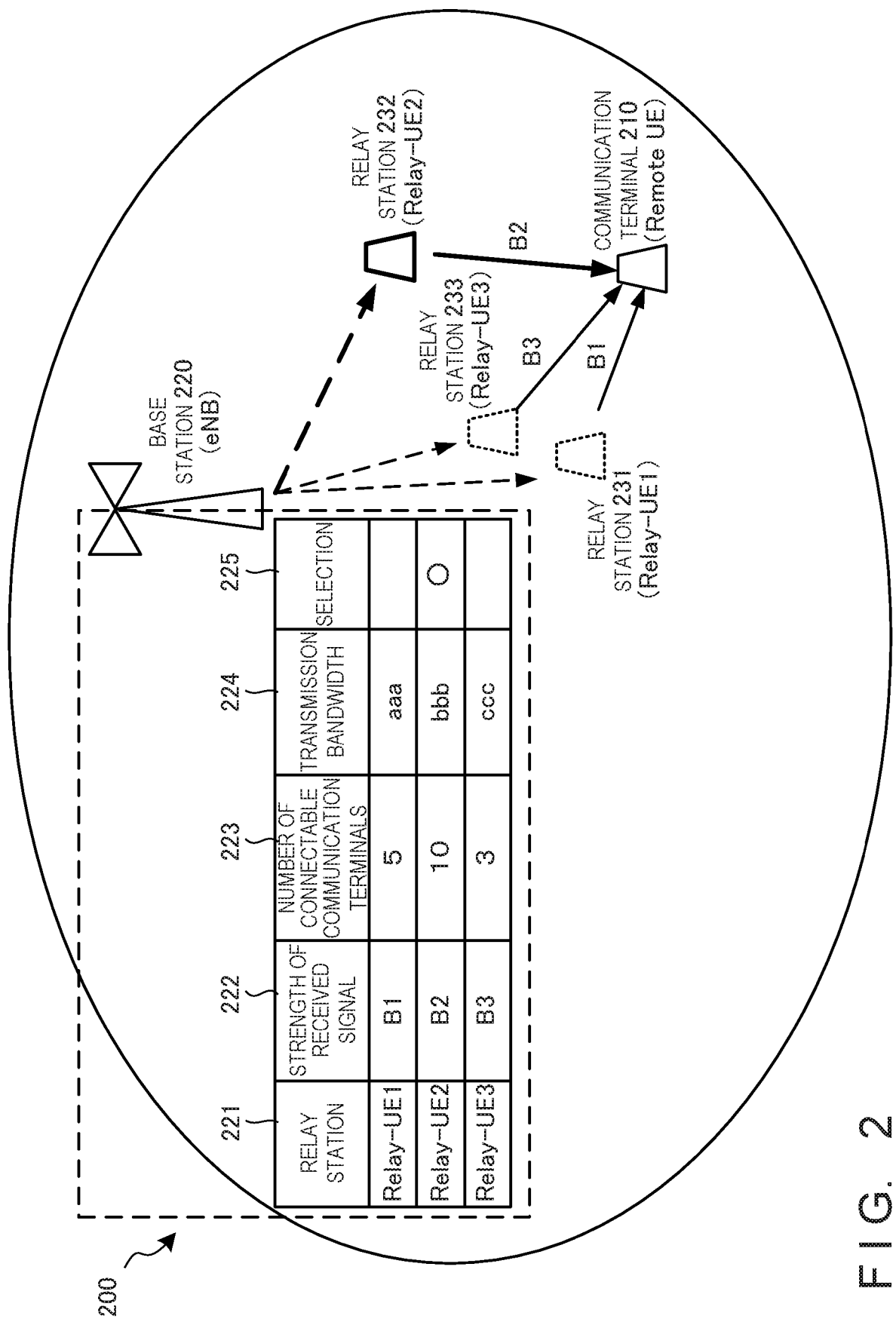
FIG. 2 is a view showing the arrangement of a communication processing system according to the second example embodiment of the present invention.

FIG. 2 is a view showing the arrangement of a communication processing system 200 according to this example embodiment. FIG. 2 shows the establishment of communication paths between a communication terminal 210 and a base station 220 via relay stations 231 to 233 in a cell managed by the base station 220.

In FIG. 2, B1 to B3 are the measurement results of received signal strengths from the relay stations 231 to 233 in the communication terminal 210. In FIG. 2, the strengths of received signals B1 to B3 are more than a threshold, and the relay stations 231 to 233 are the candidates of the relay station to be connected.

In the base station 220, a strength of received signal 222 (B1 to B3) is collected in association with each relay station 221. Additionally, in the base station 220, the number 223 of connectable communication terminals and a transmission bandwidth 224 are acquired as the capability information of each relay station in association with each relay station 221. A relay station (Relay-UE2) with the largest number 223 of connectable communication terminals or the largest transmission bandwidth 224 is selected as the relay station that relays the base station 220 and the communication terminal 210 (see 225). When the relay station (Relay-UE2) is used, it is possible to suppress the power consumption of the communication terminal 210 and also efficiently use the relay stations 231 to 233. It is therefore possible to stably efficiently use the resource of the entire communication processing system 200.

<<Technical Premise>>

A technical premise concerning the received signal strength measurement within the technical scope of this example embodiment will be described with reference to FIGS. 3A and 3B.

Figure 3A:
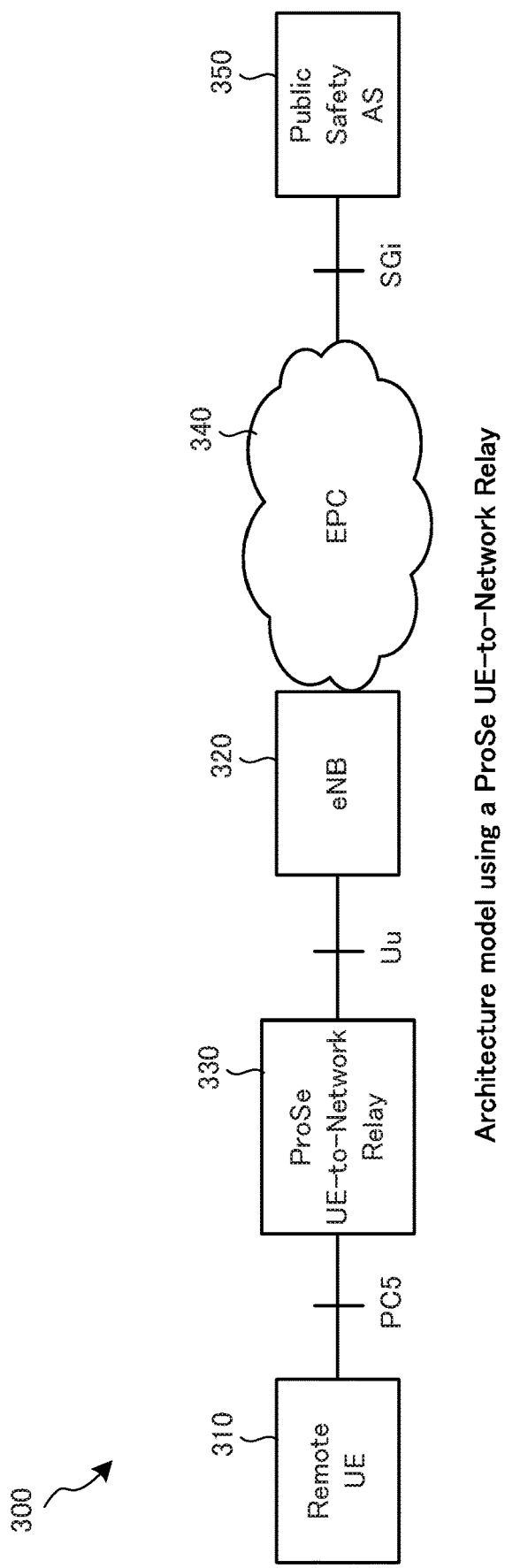
FIG. 3A is a block diagram showing the standard arrangement of a communication processing system according to a technical premise.

FIG. 3A is a block diagram showing the standard arrangement of a communication processing system 300 according to a technical premise. FIG. 3A shows the architecture model of the communication processing system 300 shown in FIG. 4.4.3-1 of "4.4.3 ProSe UE-to-Network Relay for Public Safety" of non-patent literature 1. In addition, FIG. 3B is a sequence chart showing the standard operation of the communication processing system 300 according to the technical premise. FIG. 3B shows a procedure of establishing ProSe (D2D) connection via UE-to-Network Relay shown in FIG. 5.4.4.1-1 of "5.4.4 Direct communication via ProSe UE-to-Network Relay" of non-patent literature 1.

The outline of the connection establishment procedure (S300) of UE-to-Network Relay will be described below based on FIG. 5.4.4.1-1. 1. A UE-to-Network Relay node attaches to E-UTRAN to establish PDN connection. 2. A remote UE searches for a UE-to-Network Relay node using the Model-A or Model-B discovery procedure. 3. The remote UE selects the UE-to-Network Relay node and establishes connection. 4. The UE-to-Network Relay node sets the IP address of the remote UE. 5. The UE-to-Network Relay node reports the remote UE ID and IP information to MME. 6. The MME reports the user ID and the IP information to S-GW and P-GW. 7. Relay traffic is transmitted/received between the remote UE and the P-GW.

Note that the explanation of FIG. 5.4.4.1-1 includes an account saying "even after the connection using the relay UE, to reselect a relay UE, the remote UE continuously measures the signal strength of the discovery message sent from the relay UE".

Additionally, "23.10.4 Sidelink Communication via ProSe UE-to-Network Relay" in non-patent literature 2 writes that "whether a UE can operate as a relay UE is controlled by a base station" and that "a remote UE selects a relay UE of the highest PC5 link quality, and if the signal strength of the PC5 link is less than a preset threshold, a relay UE reselection process is performed".

<<Problem of Technical Premise>>

Here, in step S300 of FIG. 3B, if there occurs necessity of selecting or reselecting a relay UE, the remote UE measures the strengths of received signals of discovery announcement messages sent from a plurality of relay UE candidates, and selects the relay UE candidate of the highest link quality as the relay UE for itself. However, when the link quality between the remote UE and the relay UE is high, with a few exceptions (interference or reflection or blocking by a building), it is considered that the distance between them is also short in many cases. However, since selection of the relay station is left to the measurement of the strength of received signal by the remote UE, conditions such as the capability of the relay UE are not taken into consideration, and it is impossible to stably efficiently use the resource in the cell managed by the access node (base station). That is, if the remote UE selects a relay UE candidate with the highest received signal strength as the relay UE for itself, selection of a relay UE with an insufficient capability may occur, although the transmission power of the remote UE is suppressed. As described above, the total resource use in the cell managed by the base station is not optimized.

<<Technical Solution According to this Example Embodiment>>

In this example embodiment, to solve or alleviate the above-described problem, the base station acquires the strength of received signal measured by the remote UE and capability information concerning a plurality of relay UE candidates, and causes the remote UE to select an optimum relay UE based on the information. Note that the remote UE according to this example embodiment includes an IoT (Internet of Things) device, an MTC (Machine Type Communication) device, an M2M (Machine to Machine) device, and the like.

<<Operation Sequence of Communication Processing System>>

FIG. 4 is a sequence chart showing the operation of the communication processing system 200 according to the second example embodiment of the present invention. FIG.

4 shows a sequence of selecting a relay station based on a new condition according to this example embodiment in step S300 of FIG. 3B.

In step S401, the base station 220 sets the frequency of a discovery signal and the measurement period in the relay stations 231 to 23n and the communication terminal 210. After that, the measurement of the strength of received signal is repeated in synchronism with the frequency and the measurement period. In addition, in step S403, the base station 220 acquires the capability information of each of the relay stations 231 to 23n.

In step S405, each of the relay stations 231 to 23n transmits a discovery signal whose signal strength is measured by the communication terminal 210. Note that in this example embodiment, a case of "Model A" in which a Discovery Announcement Message is periodically transmitted from the relay station 430 will be described. However, "Model B" in which the communication terminal 410 requests a Discovery Response Message may be used. Then, in step S407, the base station 220 collects and stores the strength of received signal from the communication terminal 210 via each relay station, which is measured by the communication terminal 210.

In step S409, the base station 220 selects a relay station whose received signal strength is more than the threshold as a candidate to be connected to the communication terminal 210. Furthermore, in step S411, the base station 220 selects a relay station of a higher capability from the relay stations selected as candidates in step S409. In step S413, the base station 220 instructs, for the communication terminal 210, the relay station to be connected, thereby establishing the communication path.

<<Functional Arrangement of Communication Processing Apparatus>>

FIG. 5 is a block diagram showing the functional arrangement of the communication processing apparatus 220 (base station: eNB) according to this example embodiment. Note that FIG. 5 shows functional components associated with this example embodiment, and other functions provided in the communication processing apparatus 220 are not illustrated.

The communication processing apparatus 220 includes a communication controller 501, a base station database 502, a relay station capability information acquirer 503, a communication terminal received signal strength acquirer 504, a communication path setter 505, a received signal strength measurement parameter setter 506, and a communication terminal position registrar 507.

The communication controller 501 controls communication between the communication processing apparatus 220 and the relay station 230 or a host device such as an MME. Note that although not illustrated in FIG. 5, the communication controller 501 may control communication between the communication processing apparatus 220 and the communication terminal 210. Additionally, in FIG. 5, one communication controller 501 controls communication with both the subordinate device and the host device.

However, a subordinate device communication controller and a host device communication controller may separately be provided.

The base station database 502 stores data necessary for the operation of the communication processing apparatus 220 serving as a base station. The relay station capability information acquirer 503 acquires, from each relay station, the capability information of the relay station held by the relay station, and stores it in the base station database 502. The communication terminal received signal strength acquirer 504 acquires the strength of received signal from the communication terminal via each relay station, which is measured by the communication terminal, from the communication terminal via the relay station, and stores it in the base station database 502. Based on the measurement results of the strengths of received signals by the communication terminal and the capability information of each relay station, which are stored in the base station database 502, the communication path setter 505 instructs to select and set the relay station 230 to be connected to the communication terminal 210. The received signal measurement parameter setter 506 refers to the base station database 502, and sets received signal measurement parameters in the communication terminal 210 or the relay station 230. The communication terminal position registrar 507 receives the position of the communication terminal 210 located in the cell of the base station, and registers the position in the host device such as an MME.

(Base Station Database)

Figure 6:
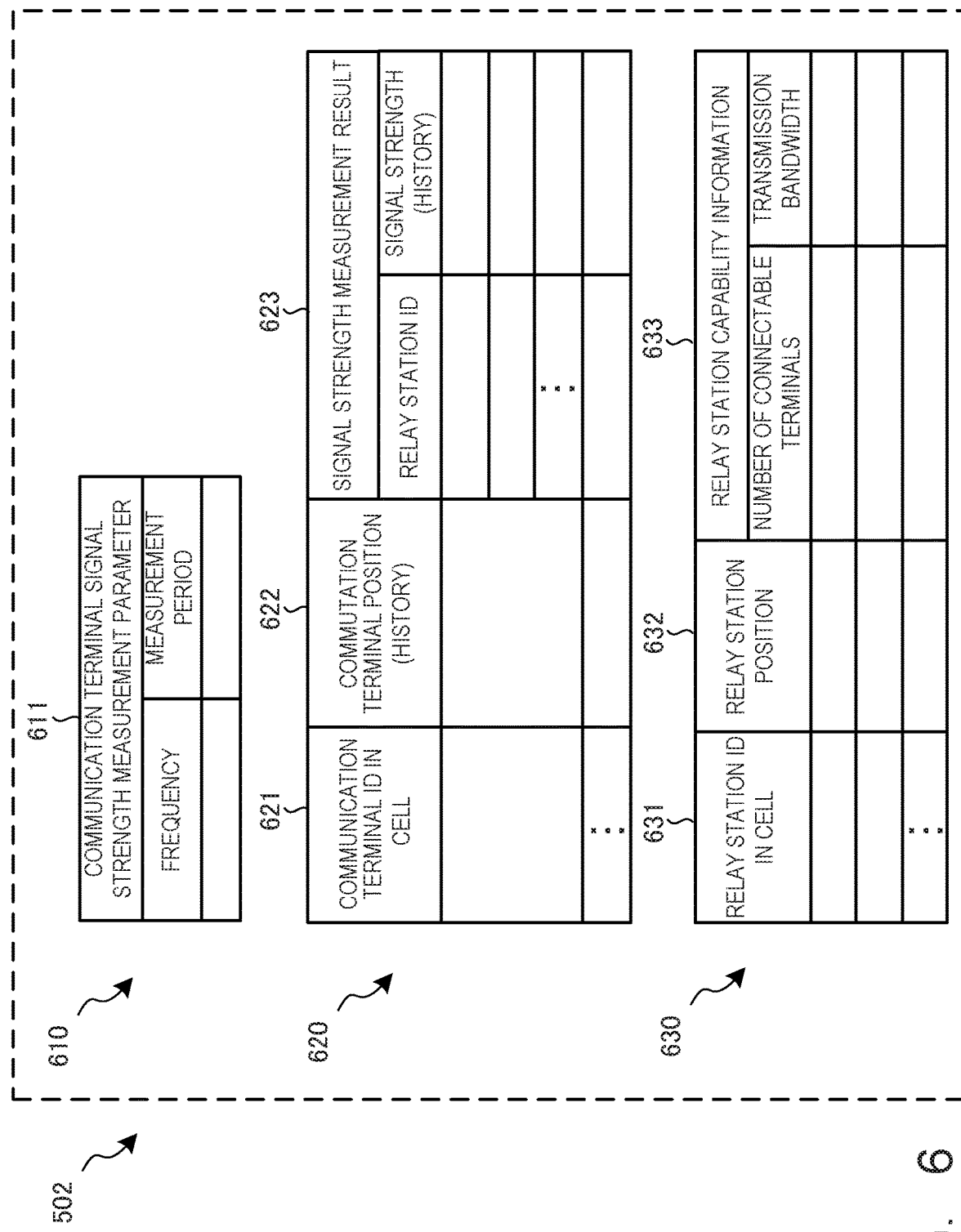
FIG. 6 is a view showing the arrangement of a base station database according to the second example embodiment of the present invention.

FIG. 6 is a view showing the arrangement of the base station database 502 according to this example embodiment. The base station database 502 stores data necessary for the operation of the communication processing apparatus 220 according to this example embodiment.

The base station database 502 includes a parameter storage portion 610 that stores parameters used to implement control according to this example embodiment for the communication terminal 210 and the relay station 230 in the cell, a communication terminal information storage portion 620 including the measurement result of the strength of received signal by the communication terminal 210 in the cell controlled by the communication processing apparatus 220, and a relay station information storage portion 630 including the capability information of the relay station 230 in the cell controlled by the communication processing apparatus 220.

The parameter storage portion 610 stores a communication terminal signal strength measurement parameter 611 necessary for discovery processing in the communication terminal. The communication terminal signal strength measurement parameter 611 includes the frequency of a signal and a measurement period.

The communication terminal information storage portion 620 stores a commutation terminal position 622, and a signal strength measurement result 623 from each relay station in association with a communication terminal ID 621 located in the cell. The signal strength measurement result 623 stores a relay station ID and a signal strength in association with each other.

The relay station information storage portion 630 stores a relay station position 632, and relay station capability information 633 in association with a relay station ID 631 located in the cell. The relay station capability information 633 according to this example embodiment includes the number of communication terminals connectable to each relay station, the transmission bandwidth of each relay station, and the like.

(Communication Path Setter)

FIG. 7 is a block diagram showing the functional arrangement of the communication path setter 505 according to this example embodiment.

The communication path setter 505 includes a communication terminal received signal strength acquirer 701, a relay station capability information acquirer 702, a received signal strength comparer 703, a relay station selector 704, and a selected relay station notifier 705.

The communication terminal received signal strength acquirer 701 acquires a strength of received signal from the communication terminal via a relay station, which is measured by each communication terminal and stored in the base station database 502. The relay station capability information acquirer 702 acquires the capability information of each relay station stored in the base station database 502. The received signal strength comparer 703 compares the strength of received signal by the communication terminal with a threshold, and selects a relay station with a strength of received signal more than the threshold as a selection candidate. The relay station selector 704 selects a relay station having a strength of received signal more than the threshold and a higher capability in the comparison results by the received signal strength comparer 703 as a connection destination for the communication terminal. The selected relay station notifier 705 notifies the communication terminal of the relay station selected by the relay station selector 704 as the connection destination.

<<Functional Arrangement of Relay Station>>

FIG. 8A is a block diagram showing the functional arrangement of the relay station 230 (relay UE) according to this example embodiment. Note that FIG. 8A shows functional components associated with this example embodiment, and other functions provided in the relay station 230 are not illustrated.

The relay station 230 includes a communication controller 801, a relay station database 802, a relay processing parameter acquirer 803, a communication relay processor 804, a discovery processing controller 805, a capability information transmitter 806, and a power supply (battery) 807.

The communication controller 801 controls communication between the relay station 230 and the base station 220 or the communication terminal 210. Note that although not illustrated in FIG. 8, the communication controller 801 may control communication with another relay station 230. Additionally, in FIG. 8A, one communication controller 801 controls communication with both the base station 220 and the communication terminal 210. However, a base station communication controller and a communication terminal communication controller may separately be provided.

The relay station database 802 stores data necessary for the operation of the relay station 230 according to this example embodiment. The relay processing parameter acquirer 803 acquires parameters necessary for relay processing set from the base station 220, and stores them in the relay station database 802. The communication relay processor 804 relays the communication between the base station 220 and the communication terminal 210 using the relay processing parameters stored in the relay station database 802. The discovery processing controller 805 controls discovery processing for the connected communication terminal 210 using parameters stored in the relay station database 802. The capability information transmitter 806 acquires capabilities of the relay station 230 from the relay station database 802 and notifies the base station of the capabilities. The power supply (battery) 807 is a power supply used to operate the relay station 230.

(Relay Station Database)

Figure 8B:
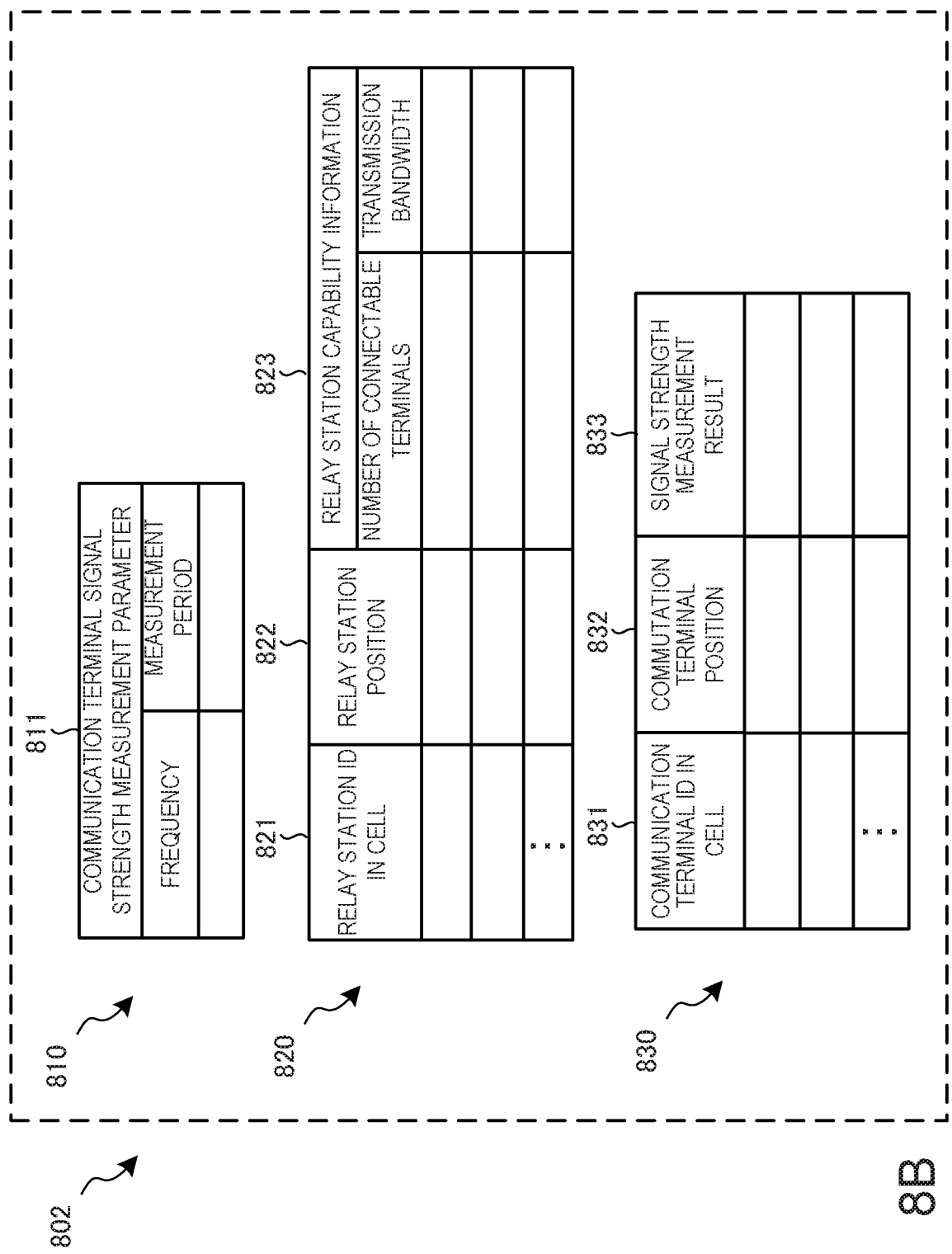
FIG. 8B is a view showing the arrangement of a relay station database according to the second example embodiment of the present invention.

FIG. 8B is a view showing the arrangement of the relay station database 802 according to this example embodiment. The relay station database 802 stores data necessary for the operation of the relay station 230 according to this example embodiment.

The relay station database 802 includes a parameter storage portion 810 that stores parameters used to transmit a signal for signal strength measurement to the communication terminal 210 in the cell, a relay station information storage portion 820 that stores relay station information including the capability information of the self-relay station 230, and a communication terminal information storage portion 830 including the measurement result of the strength of received signal by the communication terminal 210 in the cell.

The parameter storage portion 810 stores a communication terminal signal strength measurement parameter 811 necessary for discovery processing in the communication terminal. The communication terminal signal strength measurement parameter 811 includes the frequency of a signal and a measurement period.

The relay station information storage portion 820 stores a relay station position 822, and relay station capability information 823 in association with a relay station ID 821 located in the cell. The relay station capability information 823 according to this example embodiment includes the number of communication terminals connectable to each relay station, the transmission bandwidth of each relay station, and the like.

The communication terminal information storage portion 830 stores a commutation terminal position 832, and a signal strength measurement result 833 from each communication terminal in association with a communication terminal ID 831 located in the cell.

<<Functional Arrangement of Communication Terminal>>

Figure 9:
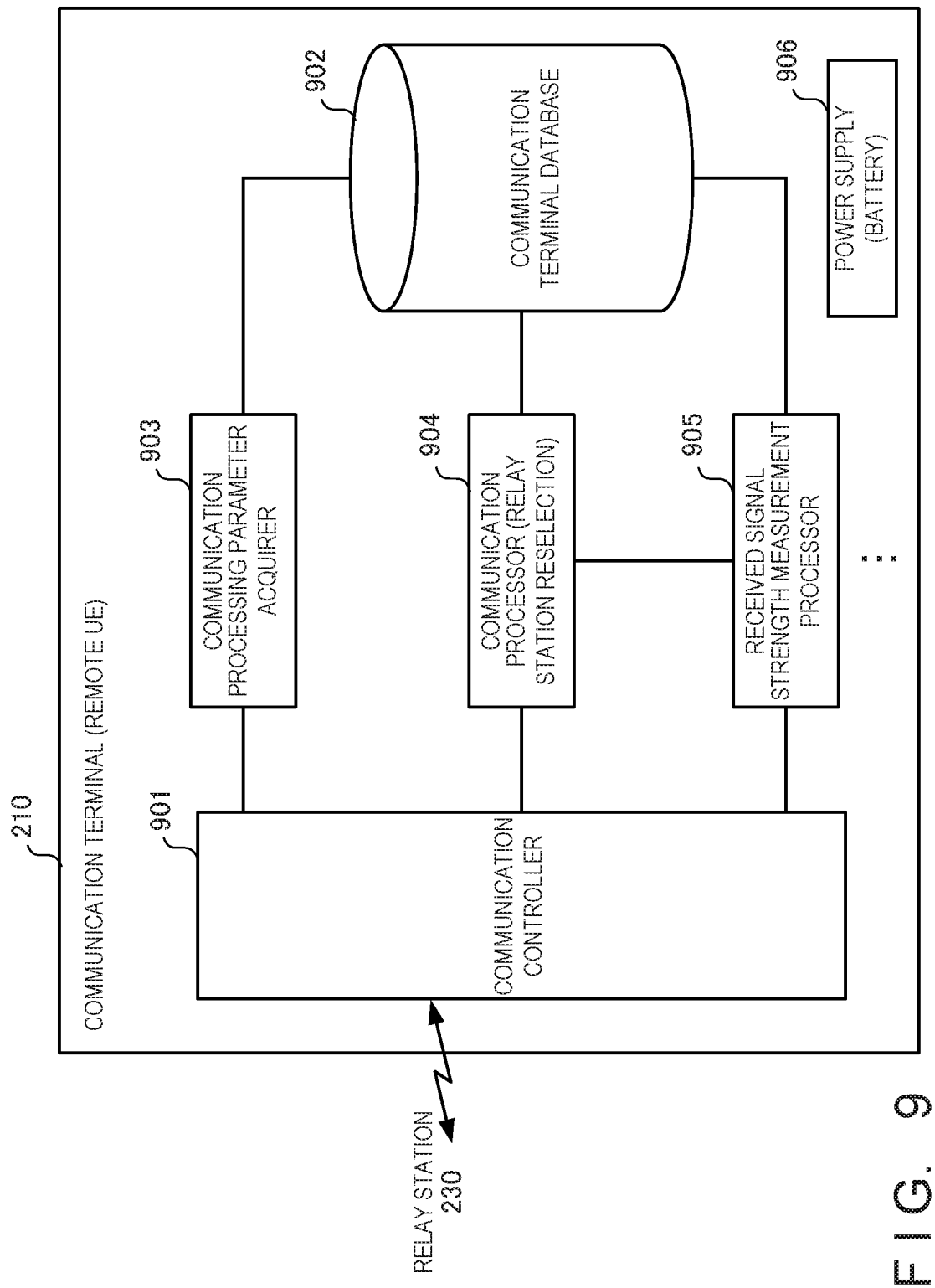
FIG. 9 is a block diagram showing the functional arrangement of a communication terminal (remote UE) according to the second example embodiment of the present invention.

FIG. 9 is a block diagram showing the functional arrangement of the communication terminal 210 (remote UE) according to this example embodiment. Note that FIG. 9 shows functional components associated with this example embodiment, and other functions provided in the communication terminal 210 are not illustrated.

The communication terminal 210 includes a communication controller 901, a communication terminal database 902, a communication processing parameter acquirer 903, a communication processor 904, a received signal strength measurement processor 905, and a power supply (battery) 906.

The communication controller 901 controls communication between the communication terminal 210 and the relay station 230. Note that although not illustrated in FIG. 9, the communication controller 901 may control communication with the base station 220 or another communication terminal 210.

The communication terminal database 902 stores data necessary for the operation of the communication terminal 210. The communication processing parameter acquirer 903 acquires parameters necessary for communication processing set from the base station 220, and stores them in the communication terminal database 902. The communication processor 904 processes communication with the base station 220 via the relay station 230 using the communication processing parameters stored in the communication terminal database 902. Note that the communication processor 904 also performs reselection processing of a relay station based on the measurement result of the strength of received signal. The received signal strength measurement processor 905 measures the strength of received signal transmitted from the relay station 230 using the parameters stored in the communication terminal database 902, and notifies the base station of the result via the relay station. The power supply (battery) 906 is the power supply for the communication terminal 210.

<<Hardware Arrangement of Communication Processing Apparatus>>

Figure 10:
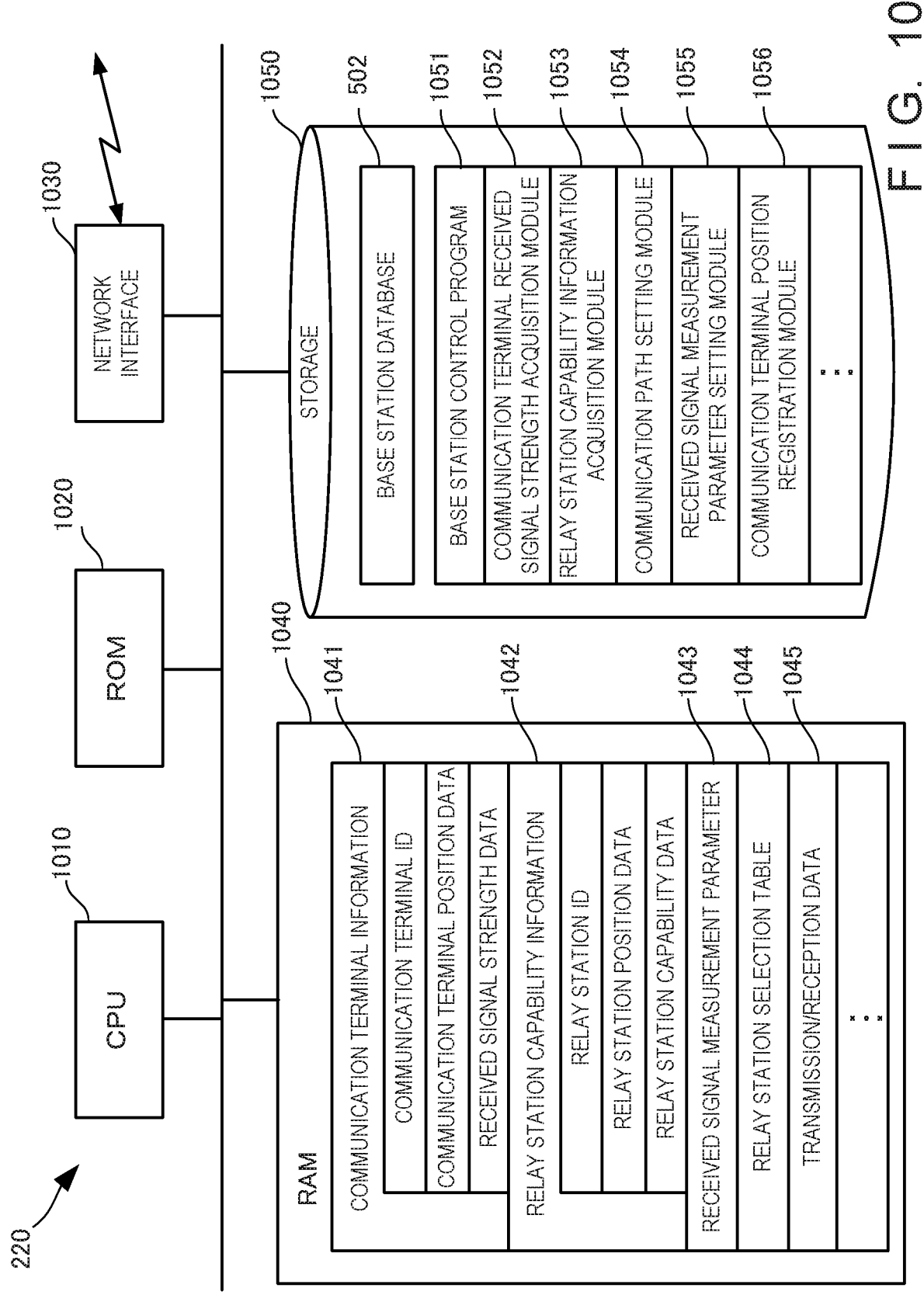
FIG. 10 is a block diagram showing the hardware arrangement of the communication processing apparatus (base station: eNB) according to the second example embodiment of the present invention.

FIG. 10 is a block diagram showing the hardware arrangement of the communication processing apparatus 220 (base station: eNB) according to this example embodiment.

In FIG. 10, a CPU (Central Processing Unit) 1010 is a processor for arithmetic control and executes a program, thereby implementing the functional components shown in FIG. 5. The CPU 1010 may include a plurality of processors and execute different programs, modules, tasks, threads, and the like in parallel. A ROM (Read Only Memory) 1020 stores initial data, the permanent data of programs, and the programs. A network interface 1030 controls communication with the relay station 230, the communication terminal 210, or another host device via a network.

A RAM (Random Access Memory) 1040 is a random access memory used by the CPU 1010 as a work area for temporary storage. In the RAM 1040, an area to store data necessary for implementation of this example embodiment is allocated. Communication terminal information 1041 is the information of a communication terminal located in the cell of the communication processing apparatus 220 serving as a base station. The communication terminal information 1041 includes communication terminal position data, received signal strength data, and the like in association with the communication terminal ID of each communication terminal. Relay station capability information 1042 is the capability information of a relay station located in the cell of the communication processing apparatus 220 serving as a base station. The relay station capability information 1042 includes relay station position data, relay station capability data, and the like in association with the relay station ID of each relay station. A received signal measurement parameter 1043 is a parameter used to measure the strength of received signal in and the communication terminal 210. A relay station selection table 1044 is a table corresponding to the algorithm of relay station selection according to this example embodiment.

Transmission/reception data 1045 is data transmitted/received to/from the relay station 230, the communication terminal 210, or another host device via the network interface 1030.

A storage 1050 stores databases, various kinds of parameters, and following data and programs necessary for implementation of this example embodiment. The base station database 502 is the database shown in FIG. 6. The storage 1050 stores the following programs. A base station control program 1051 is a program that controls information processing of the entire communication processing apparatus 220. A communication terminal received signal strength acquisition module 1052 is a module that acquires the strength of received signal measured by the communication terminal 210 from the communication terminal via a relay station, and accumulates the strength of received signal in the base station database 502. A relay station capability information acquisition module 1053 is a module that acquires capability information held by the relay station 230 from the relay station, and accumulates the capability information in the base station database 502. A communication path setting module 1054 is a module that selects the relay station 230 to be connected by referring to the strength of received signal serving as a communication history and the capability information in the base station database 502, and sets the communication path between the base station and the communication terminal. A received signal measurement parameter setting module 1055 is a module configured to set parameters used to measure the strength of received signal at a predetermined period. A communication terminal position registration module 1056 is a module configured to register the position of a communication terminal located in the cell.

Note that programs and data concerning general-purpose functions or other implementable functions of the communication processing apparatus 220 are not illustrated in the RAM 1040 and the storage 1050 shown in FIG. 10.

<<Processing Procedure of Communication Processing Apparatus>>

FIG. 11 is a flowchart showing the processing procedure of the communication processing apparatus 220 (base station: eNB) according to this example embodiment. This flowchart is executed by the CPU 1010 shown in FIG. 10 using the RAM 1040 and implements the functional components shown in FIG. 5.

In step S1101, the communication processing apparatus 220 sets the frequency of the strength measurement signal and the measurement period in the communication terminal and the relay station. In step S1103, the communication processing apparatus 220 acquires, from each relay station, capability information held by the relay station. In step S1105, the communication processing apparatus 220 acquires, via each relay station, the strength of received signal transmitted from the relay station and measured by the communication terminal.

In step S1107, the communication processing apparatus 220 compares the strength of received signal by the communication terminal with a threshold, and selects a relay station with a strength of received signal more than the threshold as a candidate. In step S1109, if another uncompared relay station remains, the communication processing apparatus 220 repeats step S1107.

If another relay station does not remain, in step S1111, the communication processing apparatus 220 selects a relay station with the larger number of connectable communication terminals or transmission bandwidth from the relay stations selected based on the signal strengths. In step S1113, the communication processing apparatus 220 notifies the communication terminal of the selected relay station, and causes them to execute data communication processing.

According to this example embodiment, the relay station is selected based on the strength of received signal from the communication terminal via the relay station measured by the communication terminal and the number of connectable communication terminals or the transmission bandwidth that is the capability information of the relay station. It is therefore possible to stably efficiently use the resource in the cell managed by the base station.

Third Example Embodiment

A communication processing system according to the third example embodiment of the present invention will be described next. The communication processing system according to this example embodiment is different from the second example embodiment in that a relay station is selected using, as the capability information of the relay station, the number of currently connected communication terminals or the load amount of the relay station. The rest of the components and operations is the same as in the second example embodiment. Hence, the same reference numerals denote the same components and operations, and a detailed description thereof will be omitted.

<<Outline of Arrangement of Communication Processing System>>

Figure 12:
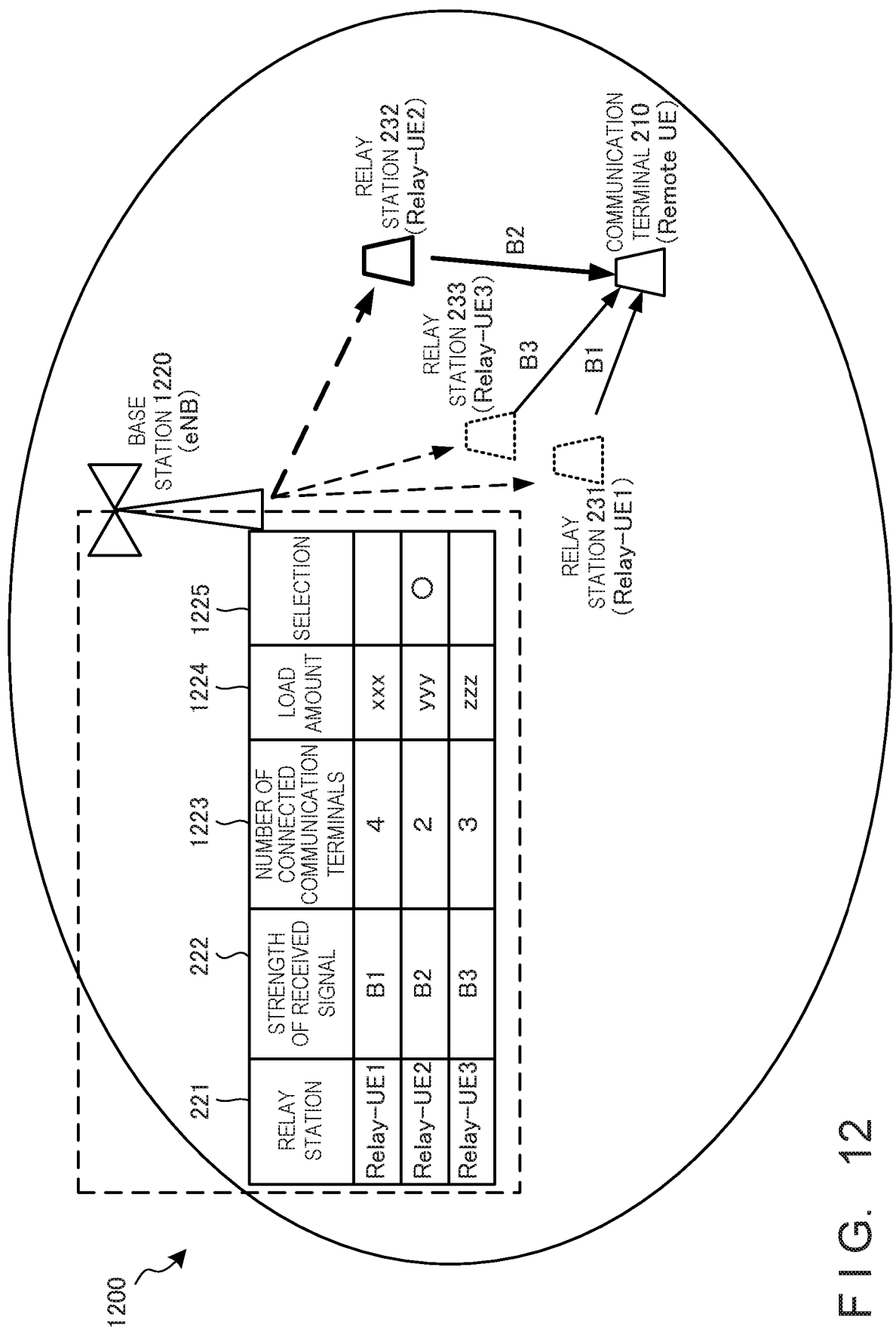
FIG. 12 is a view showing the arrangement of a communication processing system according to the third example embodiment of the present invention.

FIG. 12 is a view showing the arrangement of a communication processing system 1200 according to this example embodiment. Note that the same reference numerals as in FIG. 2 denote the same constituent elements in FIG. 12, and a repetitive description thereof will be omitted.

FIG. 12 shows the establishment of a communication path between a communication terminal 210 and a base station 1220 via relay stations 231 to 233 in a cell managed by the base station 1220. In FIG. 12, B1 to B3 are the measurement results of received signal strengths from the relay stations 231 to 233 in the communication terminal 210.

In the base station 1220, a strength of received signal 222 (B1 to B3) is collected in association with each relay station 221. Additionally, in the base station 1220, the number 1223 of connected communication terminals and a load amount 1224 are acquired as the capability information of each relay station in association with each relay station 221. A relay station (Relay-UE2) with the smallest number 1223 of connected communication terminals or the smallest load amount 1224 is selected as the relay station that relays the base station 1220 and the communication terminal 210 (see 1225). When the relay station (Relay-UE2) is used, it is possible to suppress the power consumption of the communication terminal 210 and also efficiently use the relay stations 231 to 233. It is therefore possible to stably efficiently use the resource in the overall communication processing system 1200.

(Base Station Database)

Figure 13:
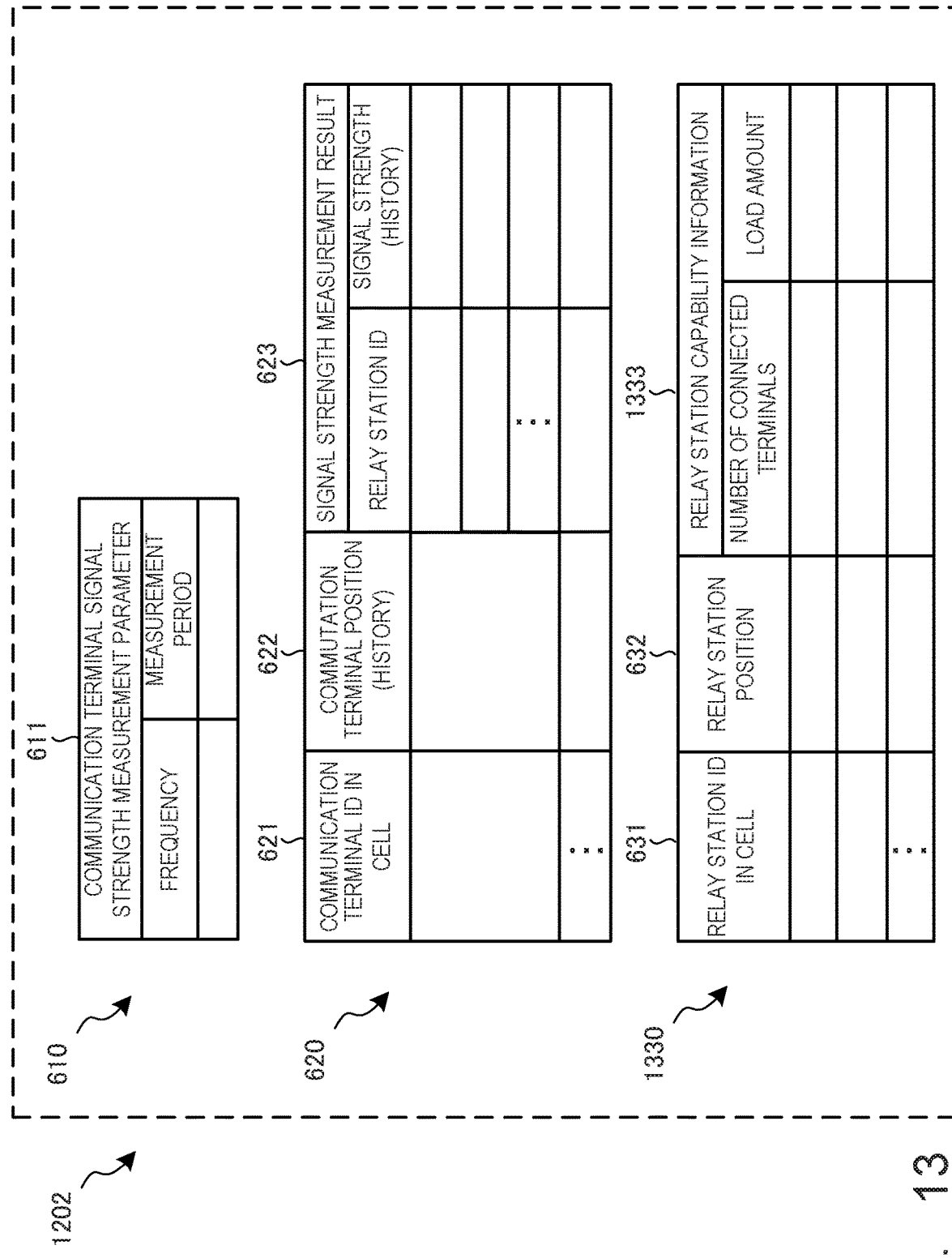
FIG. 13 is a view showing the arrangement of a base station database according to the third example embodiment of the present invention.

FIG. 13 is a view showing the arrangement of a base station database 1202 according to this example embodiment. The base station database 1202 stores data necessary for the operation of the communication processing apparatus 1220 according to this example embodiment. Note that the same reference numerals as in FIG. 6 denote the same constituent elements in FIG. 13, and a repetitive description thereof will be omitted.

The base station database 1202 includes a parameter storage portion 610, a communication terminal information storage portion 620, and a relay station information storage portion 1330 including the capability information of a relay station 230 in the cell controlled by the communication processing apparatus 1220.

The relay station information storage portion 1330 stores a relay station position 632, and relay station capability information 1333 in association with a relay station ID 631 located in the cell. The relay station capability information 1333 according to this example embodiment includes the number of communication terminals currently connected to each relay station, the load amount of each relay station, and the like.

<<Processing Procedure of Communication Processing Apparatus>>

Figure 14:
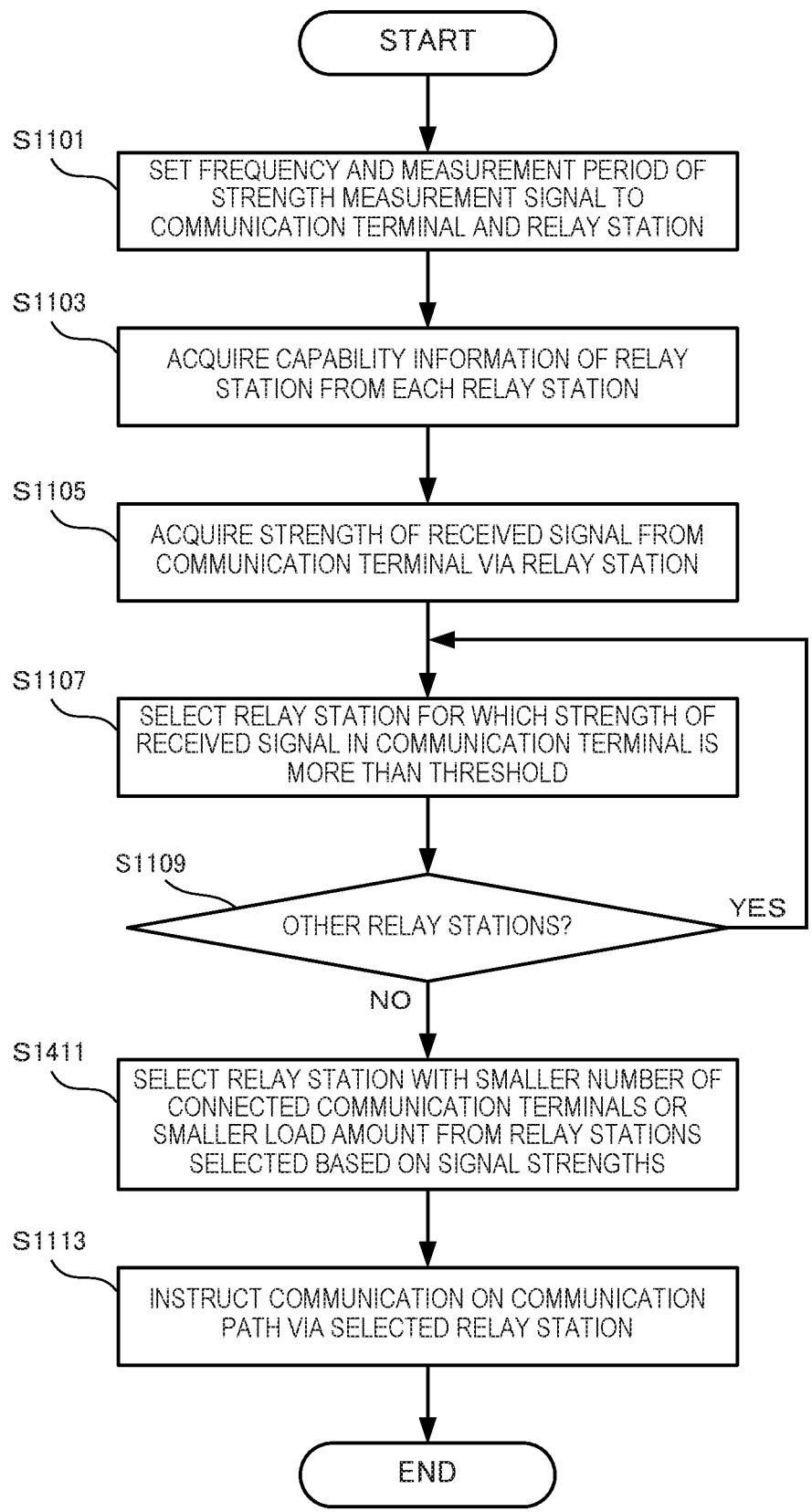
FIG. 14 is a flowchart showing the processing procedure of a communication processing apparatus (base station: eNB) according to the third example embodiment of the present invention.

FIG. 14 is a flowchart showing the processing procedure of the communication processing apparatus 1220 (base station: eNB) according to this example embodiment. Note that the same step numbers as in FIG. 11 denote the same steps in FIG. 14, and a repetitive description thereof will be omitted.

When comparison between a threshold and the strength of received signal from the communication terminal via each relay station ends, in step S1411, the communication processing apparatus 1220 selects a relay station having the smaller number of connected communication terminals or load amount from the relay stations selected based on the signal strengths.

According to this example embodiment, the relay station is selected based on the strength of received signal from the communication terminal via the relay station measured by the communication terminal and the number of connected communication terminals or the load amount that is the capability information of the relay station. It is therefore possible to stably efficiently use the resource in the cell managed by the base station.

Fourth Example Embodiment

A communication processing system according to the forth example embodiment of the present invention will be described next. The communication processing system according to this example embodiment is different from the second example embodiment and the third example embodiment in that a relay station is selected using the remaining battery level of each relay station as the capability information of the relay station. The rest of the components and operations is the same as in the second example embodiment. Hence, the same reference numerals denote the same components and operations, and a detailed description thereof will be omitted.

<<Outline of Arrangement of Communication Processing System>>

FIG. 15 is a view showing the arrangement of a communication processing system 1500 according to this example embodiment. Note that the same reference numerals as in FIG. 2 denote the same constituent elements in FIG. 15, and a repetitive description thereof will be omitted.

FIG. 15 shows the establishment of a communication path between a communication terminal 210 and a base station 1520 via relay stations 231 to 233 in a cell managed by the base station 1520. In FIG. 15, B1 to B3 are the measurement results of received signal strengths from the relay stations 231 to 233 in the communication terminal 210.

In the base station 1520, a strength of received signal 222 (B1 to B3) is collected in association with each relay station 221. Additionally, in the base station 1520, a remaining battery level 1523 of each relay station is acquired as the capability information of the relay station in association with each relay station 221. A relay station (Relay-UE2) with the largest remaining battery level is selected as the relay station that relays the base station 1520 and the communication terminal 210 (see 1525). Note that a relay station whose remaining battery level 1523 is less than a predetermined threshold is not selected. When the relay station (Relay-UE2) is used, it is possible to suppress the power consumption of the communication terminal 210 and also efficiently use the relay stations 231 to 233. It is therefore possible to stably efficiently use the resource of the entire communication processing system 1200.

(Base Station Database)

FIG. 16 is a view showing the arrangement of a base station database 1502 according to this example embodiment. The base station database 1502 stores data necessary for the operation of the communication processing apparatus 1520 according to this example embodiment. Note that the same reference numerals as in FIG. 6 denote the same constituent elements in FIG. 16, and a repetitive description thereof will be omitted.

The base station database 1502 includes a parameter storage portion 610, a communication terminal information storage portion 620, and a relay station information storage portion 1630 including the capability information of a relay station 230 in the cell controlled by the communication processing apparatus 1520.

The relay station information storage portion 1630 stores a relay station position 632, and relay station capability information 1633 in association with a relay station ID 631 located in the cell. The relay station capability information 1633 according to this example embodiment includes the remaining battery level of each relay station, and the like.

<<Processing Procedure of Communication Processing Apparatus>>

Figure 17:
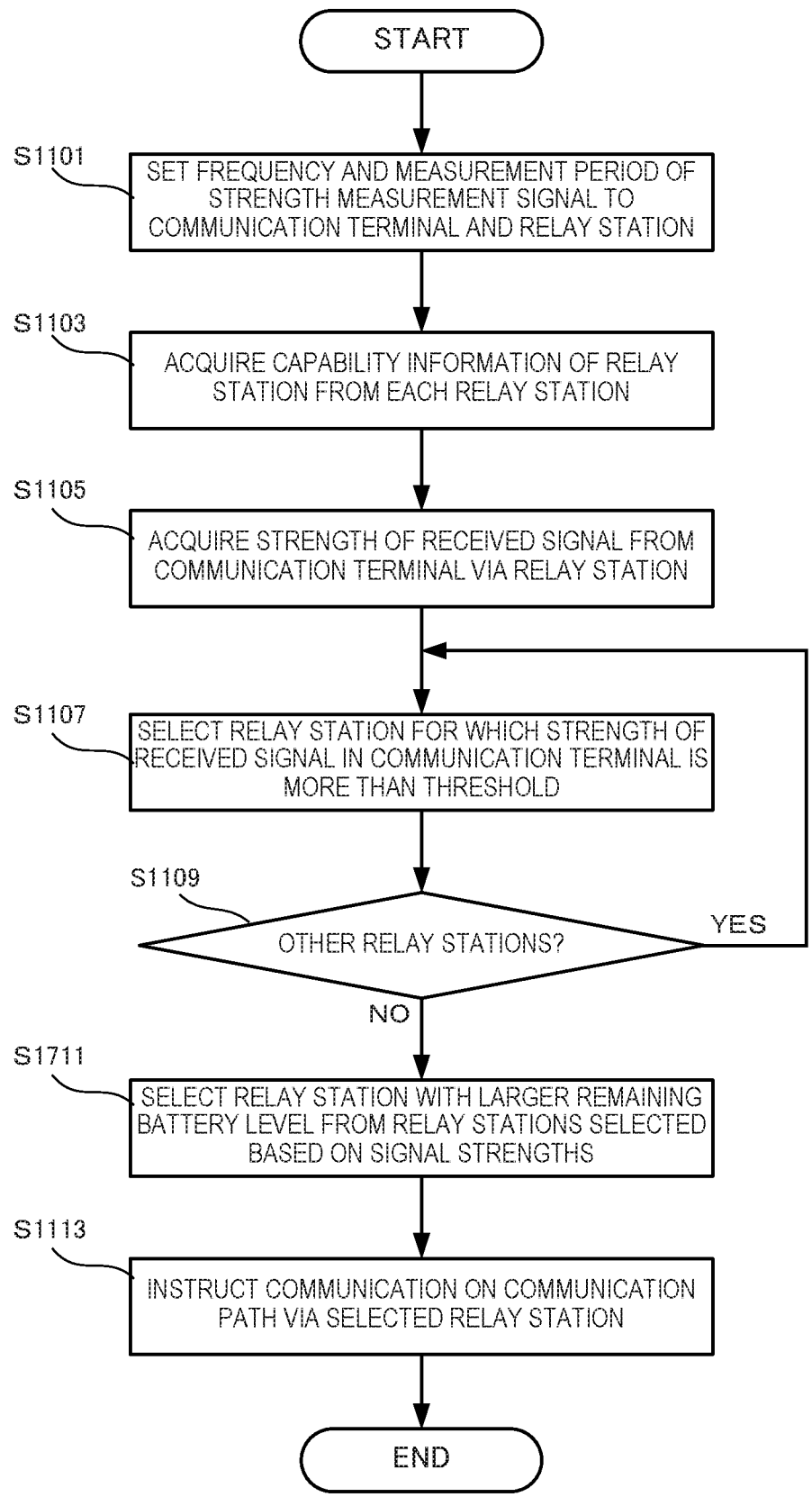
FIG. 17 is a flowchart showing the processing procedure of a communication processing apparatus (base station: eNB) according to the fourth example embodiment of the present invention.

FIG. 17 is a flowchart showing the processing procedure of the communication processing apparatus 1520 (base station: eNB) according to this example embodiment. Note that the same step numbers as in FIG. 11 denote the same steps in FIG. 17, and a repetitive description thereof will be omitted.

When comparison between a threshold and the strength of received signal from the communication terminal via each relay station ends, in step S1711, the communication processing apparatus 1520 selects a relay station having a larger remaining battery level of the relay station from the relay stations selected based on the signal strengths.

According to this example embodiment, the relay station is selected based on the strength of received signal from the communication terminal via the relay station measured by the communication terminal and the remaining battery level that is the capability information of the relay station. It is therefore possible to stably efficiently use the resource in the cell managed by the base station.

Fifth Example Embodiment

A communication processing system according to the third example embodiment of the present invention will be described next. The communication processing system according to this example embodiment is different from the second to fourth example embodiments in that a relay station is selected by combining various kinds of capability information of a relay station. The rest of the components and operations is the same as in the second example embodiment. Hence, the same reference numerals denote the same components and operations, and a detailed description thereof will be omitted.

(Base Station Database)

Figure 18:
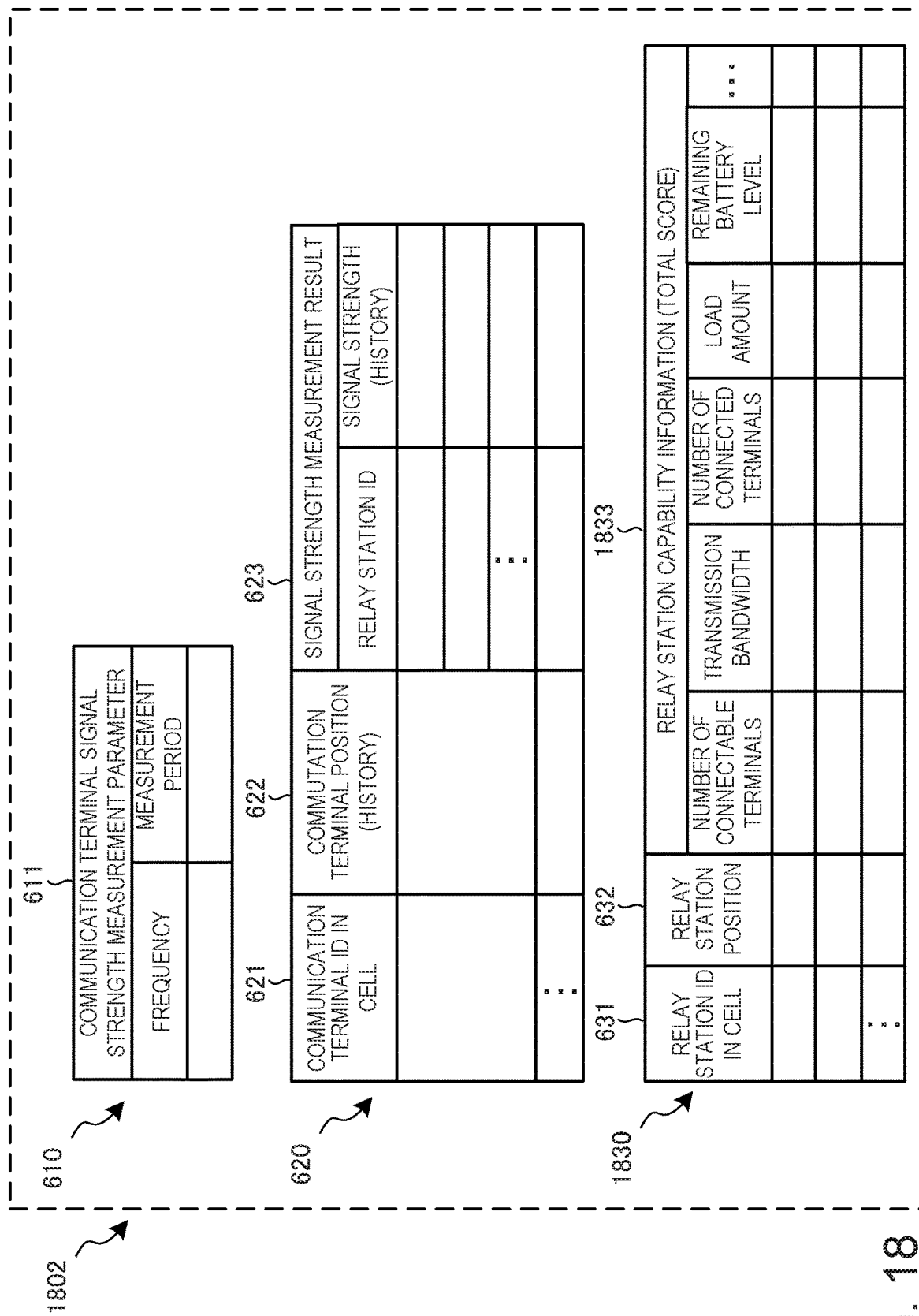
FIG. 18 is a view showing the arrangement of a base station database according to the fifth example embodiment of the present invention.

FIG. 18 is a view showing the arrangement of a base station database 1802 according to this example embodiment. The base station database 1802 stores data necessary for the operation of a communication processing apparatus 1820 according to this example embodiment. Note that the same reference numerals as in FIG. 6 denote the same constituent elements in FIG. 18, and a repetitive description thereof will be omitted.

The base station database 1802 includes a parameter storage portion 610, a communication terminal information storage portion 620, and a relay station information storage portion 1830 including the capability information of a relay station 230 in the cell controlled by the communication processing apparatus 1820.

The relay station information storage portion 1830 stores a relay station position 632, and relay station capability information 1833 in association with a relay station ID 631 located in the cell. The relay station capability information 1833 according to this example embodiment includes the number of connectable communication terminals, the transmission bandwidth, the number of connected communication terminals, the load amount, the remaining battery level of each relay station, and the like.

Note that as for the relay station capability information 1833, a more appropriate relay station is selected based on a score obtained by adding a priority order or a weight to each capability information such that the resource in the entire cell is efficiently used. It is also possible to perform management such that a relay station for which the ratio of the number of already connected communication terminals to the number of connectable communication terminals is small is selected, or a relay station for which the ratio is equal to or more than a threshold is not selected. In addition, it is possible to perform management such that if the remaining battery level is equal to or less than a threshold, other pieces of capability information are neglected, and the relay station is not selected. Furthermore, the relay station can be managed such that the transmission bandwidth or the load amount of the relay station is also associated with another capability or undergoes threshold determination. The capability information is not limited to those shown in FIG. 18.

<<Processing Procedure of Communication Processing Apparatus>>

Figure 19:
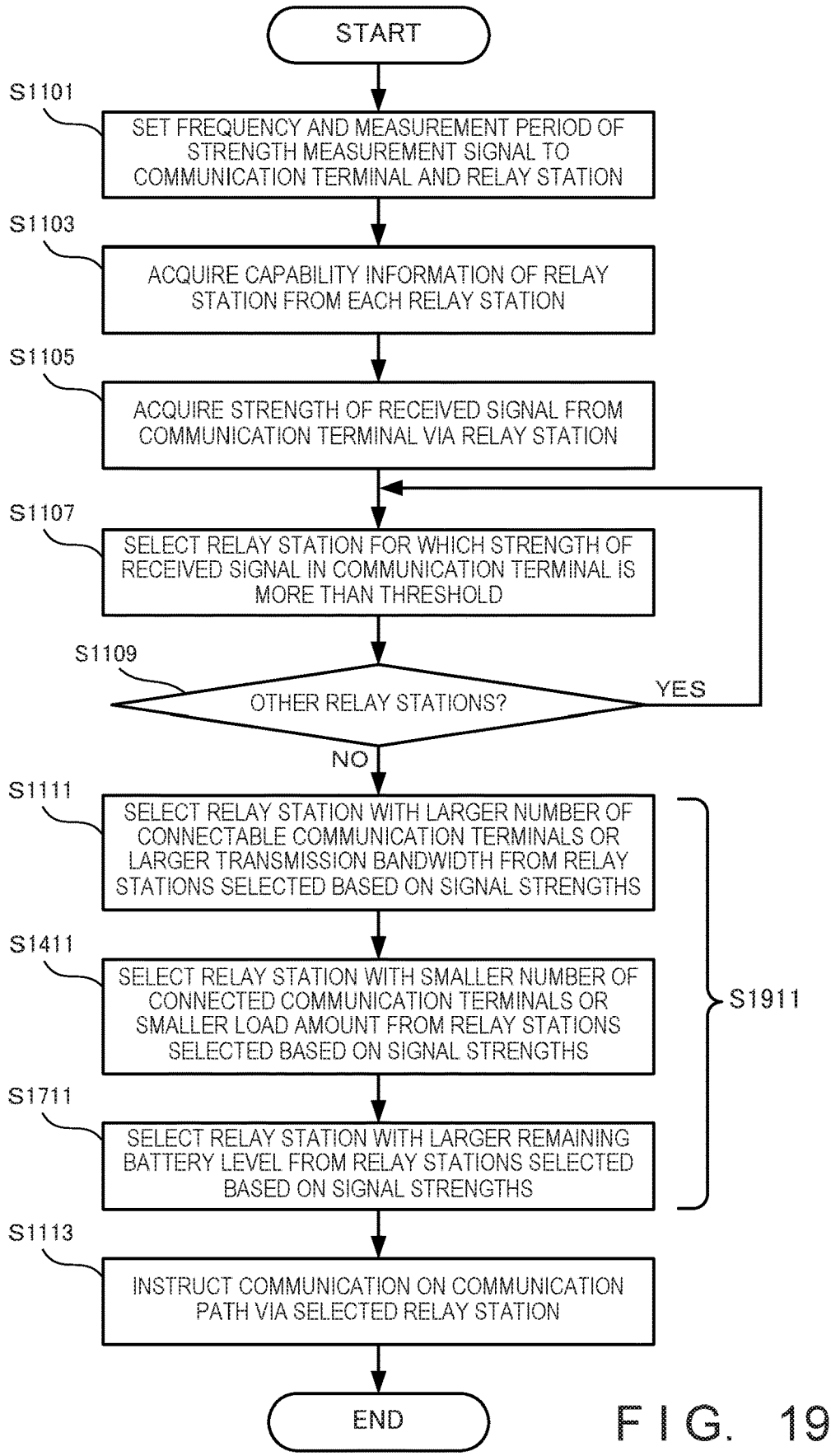
FIG. 19 is a flowchart showing the processing procedure of a communication processing apparatus (base station: eNB) according to the fifth example embodiment of the present invention.

FIG. 19 is a flowchart showing the processing procedure of the communication processing apparatus 1820 (base station: eNB) according to this example embodiment. Note that the same step numbers as in FIG. 11, 14, or 17 denote the same steps in FIG. 19, and a repetitive description thereof will be omitted.

When comparison between a threshold and the strength of received signal from the communication terminal via each relay station ends, in step S1911, the communication processing apparatus 1820 selects a relay station by totally considering the capability information of the relay stations from the relay stations selected based on the signal strengths. Note that step S1911 may include steps S1111, S1411, and S1711 in combination.

According to this example embodiment, the relay station is selected by totally considering the strength of received signal from the communication terminal via the relay station measured by the communication terminal and the capability information of the relay stations. It is therefore possible to stably efficiently use the resource in the cell managed by the base station.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described embodiments can also be described as in the following supplementary notes but are not limited to the followings.

Supplementary Note 1

There is provided a communication processing system comprising:
a communication terminal;
a base station;
a plurality of relay stations that relay communication between the communication terminal and the base station;
a measurer in the communication terminal that measures strengths of signals received from the plurality of relay stations; and
a selector in the base station that selects a relay station that connects the base station and the communication terminal based on a comparison result of at least one capability of capabilities had by each of the plurality of relay stations, when there are a plurality of relay stations whose strengths of received signals are more than a threshold.

Supplementary Note 2

There is provided the communication processing system according to supplementary note 1, wherein the selector comprises a storage unit that acquires the at least one capability from the each of the plurality of relay stations, and stores the at least one capability and the each of the plurality of relay stations in association with each other.

Supplementary Note 3

There is provided the communication processing system according to supplementary note 1 or 2, wherein the at least one capability includes at least one of the number of communication terminals connectable to the each of the plurality of relay stations and a transmission bandwidth of the each of the plurality of relay stations.

Supplementary Note 4

There is provided the communication processing system according to any one of supplementary notes 1 to 3, wherein the at least one capability includes at least one of the number of communication terminals currently connected to the each of the plurality of relay stations and a load amount on the each of the plurality of relay stations.

Supplementary Note 5

There is provided the communication processing system according to any one of supplementary notes 1 to 4, wherein the at least one capability includes a remaining battery level of the each of the plurality of relay stations.

Supplementary Note 6

There is provided the communication processing system according to any one of supplementary notes 1 to 5, wherein the selector weights the at least one capability and combines the weighted capabilities, thereby selecting the relay station that connects the base station and the communication terminal.

Supplementary Note 7

There is provided the communication processing system according to any one of supplementary notes 1 to 6, wherein the communication terminal comprises a Remote UE in 3GPP TS 23.303 V14.1.0, the base station comprises an eNB, and the relay station comprises a ProSe UE-to-NW Relay, wherein the measurement of the received signal strength by the measurer is included in a Discovery Procedure (discovery procedure).

Supplementary Note 8

There is provided the communication processing system according to any one of supplementary notes 1 to 7, wherein the communication terminal comprises an IoT device, an MTC device, and an M2M device.

Supplementary Note 9

There is provided a communication processing method of a communication processing system including a communication terminal, a base station, and a plurality of relay stations that relay communication between the communication terminal and the base station, comprising:
measuring, in the communication terminal, a received strengths of signals received from the plurality of relay stations; and
selecting, in the base station, a relay station that connects the base station and the communication terminal, based on a comparison result of at least one capability of capabilities had by each of the plurality of the relay stations, when there exist a plurality of relay stations whose strengths of received signals are more than a threshold.

Supplementary Note 10

There is provided a base station comprising:
a receiver that receives, from a communication terminal, strengths of signals which are measured, in the communication terminal, based on the signals received from a plurality of relay stations that relay communication between the communication terminal and the base station;
a storage unit that receives capabilities from each of the plurality of relay stations and stores the capabilities and the each of the plurality of relay stations in association with each other; and
a selector that selects a relay station that connects the base station and the communication terminal, based on a comparison result of at least one capability of the capabilities had by the each of the plurality of relay stations, when there exist a plurality of relay stations whose strengths of received signals are more than a threshold.

Supplementary Note 11

There is provided a control method of a base station, comprising:
receiving, from a communication terminal, strengths of signals which are measured, in the communication terminal, based on the signals received from the plurality of relay stations that relay communication between a communication terminal and the base station;
receiving capabilities from each of the plurality of relay stations and storing the capability and the each of the plurality of relay stations in association with each other; and
selecting a relay station that connects the base station and the communication terminal, based on a comparison result of at least one capability of the capabilities had by the each of the plurality of relay stations, when there are a plurality of relay stations whose strengths of received signal are more than a threshold.

Supplementary Note 12

There is provided a base station control program for causing a computer to execute a method, comprising:

receiving, from a communication terminal, strengths of signals which are measured, in the communication terminal, based on the signals received from the plurality of relay stations that relay communication between a communication terminal and the base station;

receiving capabilities from each of the plurality of relay stations and storing the capability and the each of the plurality of relay stations in association with each other; and selecting a relay station that connects the base station and the communication terminal, based on a comparison result of at least one capability of the capabilities had by the each of the plurality of relay stations, when there are a plurality of relay stations whose strengths of received signal are more than a threshold.

The invention claimed is:

1. A communication processing method of a communication processing system including a communication terminal, a base station, and a plurality of relay stations relaying communication between the communication terminal and the base station, comprising:

measuring, in the communication terminal, strengths of signals received from the plurality of relay stations; and selecting, in the base station, a relay station that relays the base station and the communication terminal from at least two relay stations included in the plurality of relay stations, based on a comparison result of at least one capability of capabilities of each of the at least two relay stations, when strengths of signals received from the at least two relay stations by the communication terminal are greater than a threshold.

2. The communication processing method according to claim 1, further comprising:

acquiring the capabilities from the each of the plurality of relay stations; and storing the capabilities and the each of the plurality of relay stations in association with each other.

3. A base station comprising:

a receiver that receives, from a communication terminal, strengths of signals which are measured, in the communication terminal, based on the signals received from a plurality of relay stations relaying communication between the communication terminal and the base station;

a storage unit that receives capabilities from each of the plurality of relay stations and stores the capabilities and the each of the plurality of relay stations in association with each other; and a selector that selects a relay station that relays the base station and the communication terminal from at least two relay stations included in the plurality of relay stations, based on a comparison result of at least one capability of the capabilities of the each of the at least two relay stations, when strengths of signals received from the at least two relay stations by the communication terminal are greater than a threshold.

4. The base station according to claim 3, wherein the at least one capability includes a number of communication terminals connectable to the each of the at least two relay stations and a transmission bandwidth of the each of the at least two relay stations.

5. The base station according to claim 4, wherein the at least one capability further includes the number of communication terminals currently connected to the each of the at least two relay stations and a load amount on the each of the at least two relay stations.

6. The base station according to claim 4, wherein the at least one capability includes a remaining battery level of the each of the at least two relay stations.

7. The base station according to claim 5, wherein the at least one capability includes a remaining battery level of the each of the at least two relay stations.

8. The base station according to claim 5, wherein the selector weights the at least one capability and combines the weighted capabilities, thereby selecting the relay station that relays the base station and the communication terminal.

9. The base station according to claim 7, wherein the selector weights the at least one capability and combines the weighted capabilities, thereby selecting the relay station that relays the base station and the communication terminal.

10. The base station according to claim 3, wherein the at least one capability includes a number of communication terminals currently connected to the each of the at least two relay stations and a load amount on the each of the at least two relay stations.

11. The base station according to claim 10, wherein the at least one capability includes a remaining battery level of the each of the at least two relay stations.

12. The base station according to claim 3, wherein the at least one capability includes a remaining battery level of the each of the at least two relay stations.

13. The base station according to claim 3, wherein the selector weights the at least one capability and combines the weighted capabilities, thereby selecting the relay station that relays the base station and the communication terminal.

14. The base station according to claim 3, wherein the communication terminal comprises a Remote UE (User Equipment) in 3GPP (3rd Generation Partnership Project) 23.303 V14.1.0, the base station comprises an eNB (evolved Node B), and the relay station comprises a ProSe (Proximity-based service) UE-to-NW (Network) Relay, wherein the measurement of the received signal strength by the measurer is included in a Discovery Procedure.

15. The base station according to claim 3, wherein the communication terminal comprises an IoT (Internet of Things) device, an MTC (Machine Type Communication) device, and an M2M (Machine to Machine) device.

16. The base station according to claim 3, wherein the at least one capability includes a number of communication terminals connectable to the each of the at least two relay stations.

17. The base station according to claim 3, wherein the at least one capability includes a transmission bandwidth of the each of the at least two relay stations.

18. The base station according to claim 3, wherein the at least one capability includes a number of communication terminals currently connected to the each of the at least two relay stations.

19. The base station according to claim 3, wherein the at least one capability includes a load amount on the each of the at least two relay stations.

20. A non-transitory computer-readable storage medium storing a base station control program for causing a computer to execute a method, comprising:

receiving, from a communication terminal, strengths of signals which are measured, in the communication terminal, based on the signals received from the plurality of relay stations relaying communication between a communication terminal and the base station;

receiving capabilities from each of the plurality of relay stations and storing the capabilities and the each of the plurality of relay stations in association with each other; and selecting a relay station that relays the base station and the communication terminal from at least two relay stations, based on a comparison result of at least one capability of the capabilities had by the each of the at least two relay stations, when strengths of signals received from the at least two relay stations by the communication terminal are greater than a threshold.

* * * * *